US012558906B2

(12) United States Patent　　(10) Patent No.:　US 12,558,906 B2

Arakane　　(45) Date of Patent:　Feb. 24, 2026

(54) NON-TRANSITORY COMPUTER READABLE MEDIUM RECORDED WITH PROGRAM AND LIQUID EJECTING APPARATUS

(71) Applicant: BROTHER KOGYO KABUSHIKI KAISHA, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 171 days.

(21) Appl. No.: 18/183,303

(22) Filed: Mar. 14, 2023

(65) Prior Publication Data

US 2023/0302835 A1　　Sep. 28, 2023

(30) Foreign Application Priority Data

Mar. 25, 2022　　(JP) ................................ 2022-050361

(51) Int. Cl.
　　*B41J 2/165*　　　(2006.01)
　　*B41J 2/045*　　　(2006.01)
　　　　　　(Continued)

(52) U.S. Cl.
　　CPC ......... *B41J 2/2142* (2013.01); *B41J 2/04541* (2013.01); *B41J 2/145* (2013.01);
　　　　　　(Continued)

(58) Field of Classification Search
　　CPC ..... B41J 2/01; B41J 2/135; B41J 2/165; B41J 2/205; B41J 2/21; B41J 2/2103; B41J 2/2132; B41J 2/2139; B41J 2/2142; G06F 13/10; G06F 13/14; G06F 13/38; G01F 13/102
　　See application file for complete search history.

(56) References Cited

U.S. PATENT DOCUMENTS 6,885,472 B1 * 4/2005 Konno ................... G06K 15/02
　　　　　　　　　　　347/14
2007/0139461 A1　6/2007 Izuo
　　　　　　(Continued)

FOREIGN PATENT DOCUMENTS

JP　　2001-63058 A　　3/2001
JP　　2007-152889 A　　6/2007
　　　　　(Continued)

*Primary Examiner* — Douglas X Rodriguez
*Assistant Examiner* — Kendrick X Liu
(74) *Attorney, Agent, or Firm* — Merchant & Gould P.C.

(57)　　　　ABSTRACT

An external apparatus communicates with a liquid ejecting apparatus provided with a head and a memory for storing nozzle-information. A program for controlling the external apparatus allows a computer to execute a procedure for acquiring first information corresponding to the nozzle-information from the liquid ejecting apparatus, and a procedure for judging whether or not second information is to be acquired from the liquid ejecting apparatus on the basis of the first information, the second information being information corresponding to the nozzle-information and the second information having a data amount larger than that of the first information. If it is judged that the second information is to be acquired from the liquid ejecting apparatus, a procedure for acquiring the second information from the liquid ejecting apparatus is executed.

14 Claims, 17 Drawing Sheets

(51) Int. Cl.

| | |
|---|---|
| *B41J 2/145* | (2006.01) |
| *B41J 2/175* | (2006.01) |
| *B41J 2/205* | (2006.01) |
| *B41J 2/21* | (2006.01) |
| *B41J 29/393* | (2006.01) |
| *G06F 13/10* | (2006.01) |
| *G06F 13/14* | (2006.01) |
| *G06F 13/38* | (2006.01) |

(52) U.S. Cl.
CPC ............. *B41J 2/165* (2013.01); *B41J 2/1752* (2013.01); *B41J 2/205* (2013.01); *B41J 2/2103* (2013.01); *B41J 2/2139* (2013.01); *B41J 29/393* (2013.01); *G06F 13/102* (2013.01); *G06F 13/14* (2013.01); *G06F 13/38* (2013.01)

(56) References Cited

U.S. PATENT DOCUMENTS

| | | |
|---|---|---|
| 2014/0300657 A1 | 10/2014 | Ike |
| 2015/0343763 A1 | 12/2015 | Zhang |
| 2021/0303245 A1 | 9/2021 | Toda |

FOREIGN PATENT DOCUMENTS

| | | | |
|---|---|---|---|
| JP | 2011-248565 | A | 12/2011 |
| JP | 2013-144371 | A | 7/2013 |
| JP | 2014-200982 | A | 10/2014 |
| JP | 2015-66890 | A | 4/2015 |
| JP | 2015-223762 | A | 12/2015 |
| JP | 2021-157593 | A | 10/2021 |

* cited by examiner

FIG. 1

HIGH VOLTAGE
POWER SOURCE
CIRCUIT

CONTROLLER

SIGNAL
PROCESSING
CIRCUIT

77

80

78

UP-DOWN
DIRECTION

LEFT ◄——————► RIGHT
SCANNING
DIRECTION

FIG. 8A

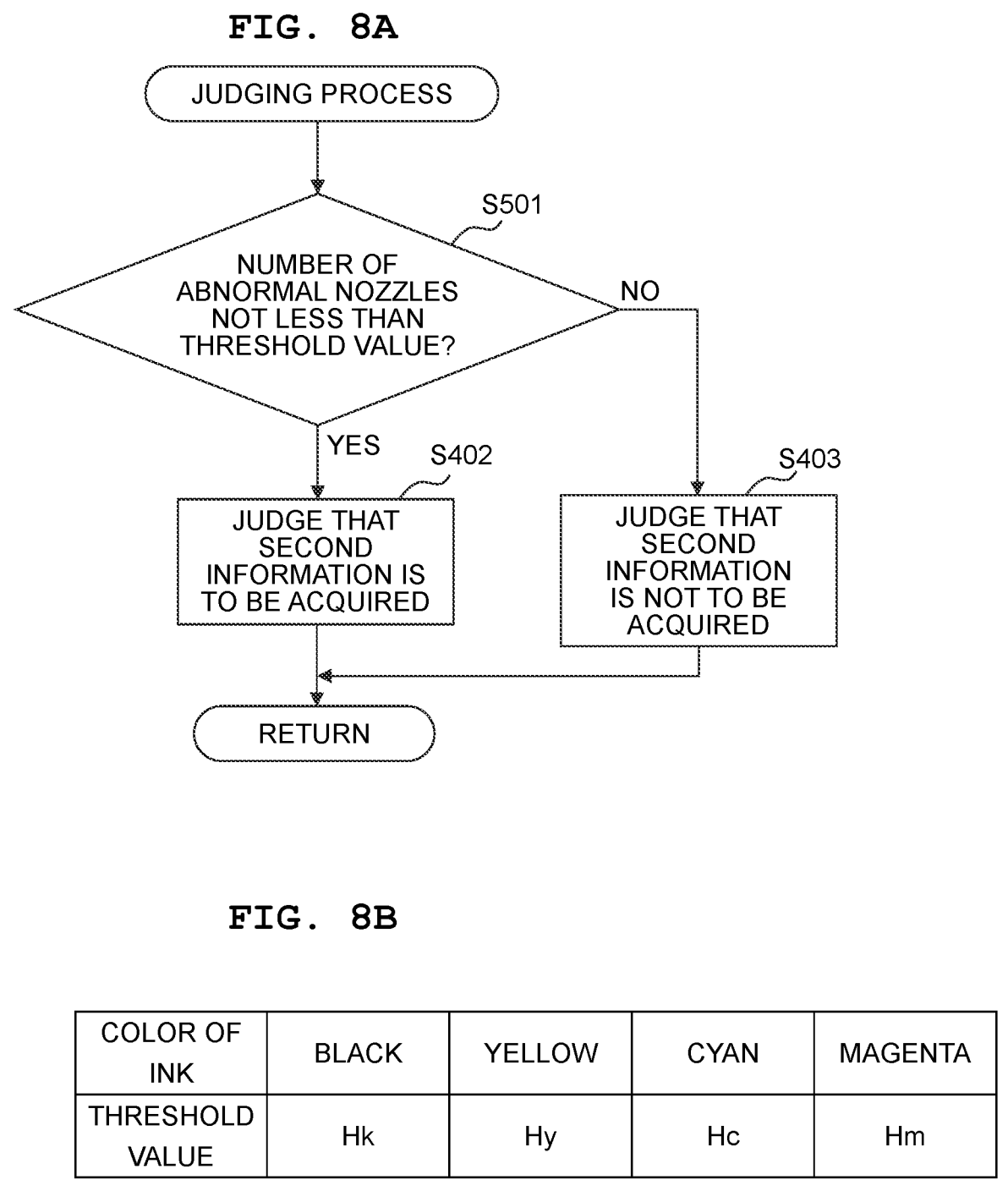

JUDGING PROCESS

S501

NUMBER OF ABNORMAL NOZZLES NOT LESS THAN THRESHOLD VALUE?

NO

YES    S402

JUDGE THAT SECOND INFORMATION IS TO BE ACQUIRED

S403

JUDGE THAT SECOND INFORMATION IS NOT TO BE ACQUIRED

RETURN

FIG. 8B

| COLOR OF INK | BLACK | YELLOW | CYAN | MAGENTA |
|---|---|---|---|---|
| THRESHOLD VALUE | Hk | Hy | Hc | Hm |

NON-TRANSITORY COMPUTER READABLE MEDIUM RECORDED WITH PROGRAM AND LIQUID EJECTING APPARATUS

REFERENCE TO RELATED APPLICATIONS

This application claims priority from Japanese Patent Application No. 2022-050361 filed on Mar. 25, 2022. The entire content of the priority application is incorporated herein by reference.

BACKGROUND ART

A printer is known, which performs the recording by ejecting an ink from nozzles as an example of the liquid ejecting apparatus which ejects the liquid from the nozzles. A recording system is formed by connecting the printer and a host computer so that the communication can be performed therebetween. A certain known printer is configured so that the nozzle check and the cleaning can be performed. In the case of a certain known recording system, if an application execution unit requests information relevant to the state of the nozzles of the printer, a printer driver execution unit generates a status request command which is transmitted to the printer. The printer, which receives the status request command, transmits, to the host computer, the status information which includes the result of the nozzle check after the cleaning executed immediately therebefore. The printer driver execution unit receives the status information transmitted from the printer to acquire the information relevant to the nozzle state included in the status information. The information is outputted to the application execution unit. In this case, the status information is the information which indicates whether or not any discharge failure is caused for each of the plurality of nozzles of the printing head.

DESCRIPTION

In general, the printing head of the printer has the plurality of nozzles. The status information, which indicates whether or not the discharge failure is caused for each of the plurality of nozzles, has the data amount which is large in some cases. In such a situation, a lot of time is required to transmit the status information from the printer to the host computer.

An object of the present disclosure is to provide a non-transitory recording medium recorded with a program provided to control an external apparatus configured to communicate with a liquid ejecting apparatus which is configured to suppress the time required to make communication between the liquid ejecting apparatus and the external apparatus, and the liquid ejecting apparatus.

According to an aspect of the present disclosure, there is provided a non-transitory computer readable medium recorded with a program for controlling an external apparatus configured to communicate with a liquid ejecting apparatus including a head having a plurality of nozzles and a memory configured to store nozzle-information to indicate states of the plurality of nozzles, wherein the program allows a computer to execute: acquiring first information corresponding to the nozzle-information from the liquid ejecting apparatus; judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus.

FIG. 1 is a schematic drawing illustrative of a printer.

FIG. 8A is a flow chart illustrative of a flow of a judging process, and FIG. 8B is a drawing to explain the threshold value.

FIRST EMBODIMENT

Figure 2:
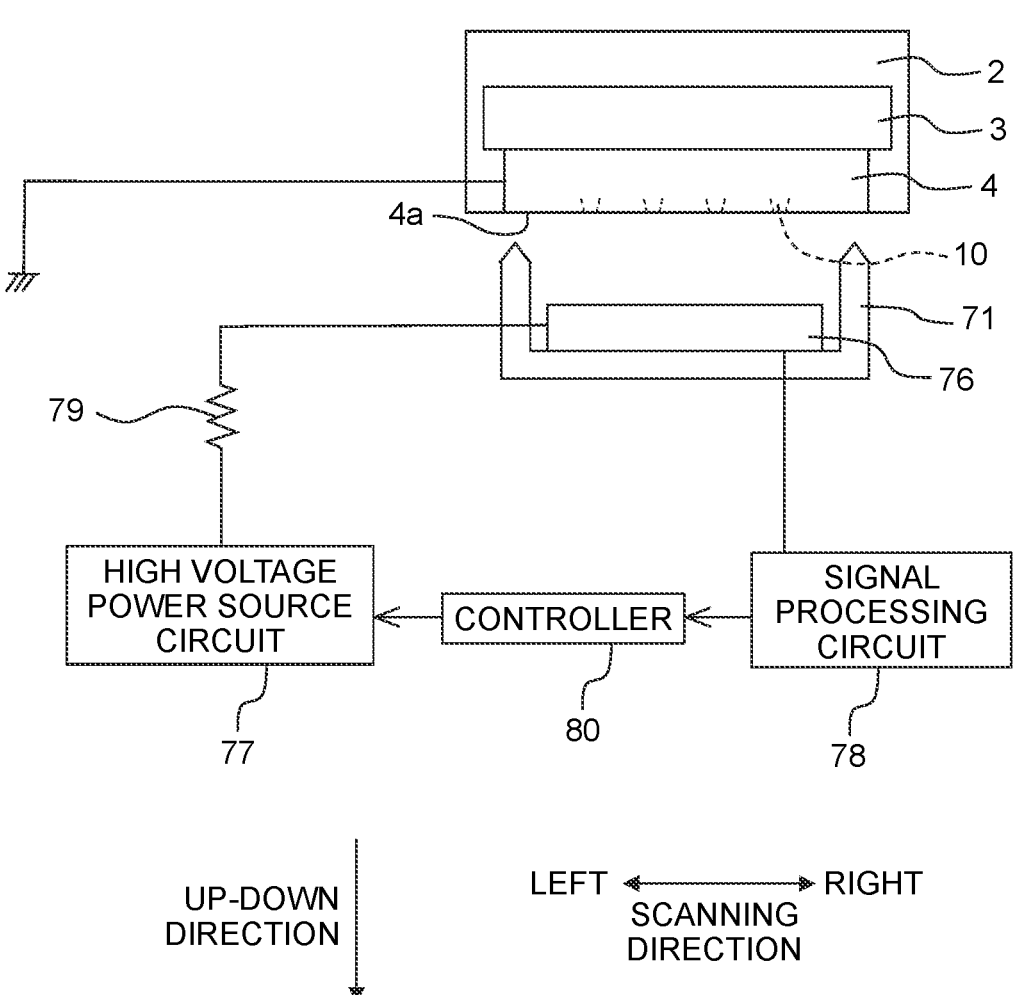
FIG. 2 is a drawing to explain an electrode arranged in a cap and a relationship of connection among the electrode, a high voltage power source circuit, and a signal processing circuit.

A first embodiment of the present disclosure will be explained below.

<Overall Configuration of Printer>

Figure 1:
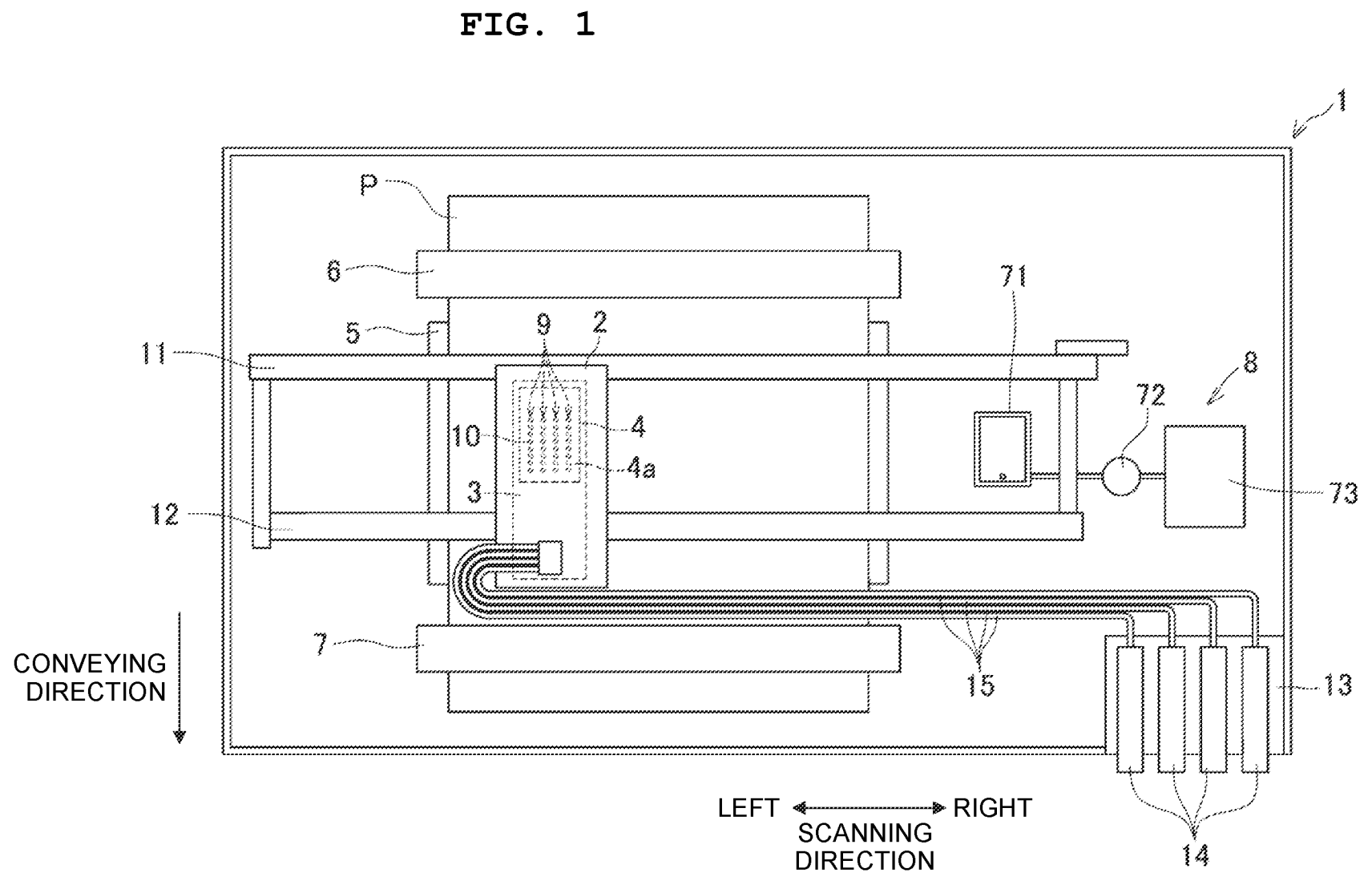

As depicted in FIG. 1, a printer 1 according to a first embodiment ("liquid ejecting apparatus" of the present disclosure) is provided, for example, with a carriage 2, a subtank 3, an ink-jet head 4 ("head" of the present disclosure), a platen 5, conveying rollers 6, 7, and a maintenance unit 8 ("recovery unit" of the present disclosure).

The carriage 2 is supported by two guide rails 11, 12 which extend in the scanning direction. Note that in the following description, as depicted in FIG. 1, an explanation will be made while defining the right side and the left side in the scanning direction. The carriage 2 is connected to a carriage motor 86 (see FIG. 4) by the aid of, for example, an unillustrated belt. When the carriage motor 86 is driven, the carriage 2 is moved in the scanning direction along the guide rails 11, 12.

The subtank 3 is carried on the carriage 2. In this arrangement, the printer 1 is provided with a cartridge holder 13. Four ink cartridges 14 are removably installed to the cartridge holder 13. The four ink cartridges 14, which are installed to the cartridge holder 13, are aligned in the scanning direction. The four ink cartridges 14 store the inks of black, yellow, cyan, and magenta ("liquid" of the present disclosure) as referred to in this order starting from one positioned on the right side in the scanning direction.

The ink-jet head 4 is carried on the carriage 2, and the ink-jet head 4 is connected to the lower end portion of the subtank 3. The four color inks described above are supplied to the ink-jet head 4 from the subtank 3. Further, the ink-jet head 4 ejects the inks from a plurality of nozzles 10 which is formed on a nozzle surface 4a as the lower surface thereof. An explanation will be made in more detail below. Four nozzle arrays 9 are aligned in the scanning direction on the nozzle surface 4a. Each of the nozzle arrays 9 has the plurality of nozzles 10 which is aligned in the conveying direction orthogonal to the scanning direction. The inks of black, yellow, cyan, and magenta are ejected from the plurality of nozzles 10 as referred to in this order starting from those constructing the nozzle array 9 disposed on the right side in the scanning direction. In this way, in the first embodiment, the type of the ink ejected from the nozzles 10 differs among the four nozzle arrays 9. Note that the plurality of nozzles 10, which forms one nozzle array 9 of the four nozzle arrays 9, corresponds to the "first nozzles" of the present disclosure, and the plurality of nozzles 10, which forms another one nozzle array 9, corresponds to the "second nozzles" of the present disclosure.

The platen 5 is arranged under or below the ink-jet head 4, and the platen 5 is opposed to the plurality of nozzles 10. The platen 5 extends over the entire length of the recording paper P in the scanning direction, and the platen 5 supports the recording paper P at the lower position. The conveying roller 6 is arranged on the upstream side in the conveying direction from the ink-jet head 4 and the platen 5. The conveying roller 7 is arranged on the downstream side in the conveying direction from the ink-jet head 4 and the platen 5. The conveying rollers 6, 7 are connected to a conveyance motor 87 (see FIG. 4), for example, via unillustrated gears. When the conveyance motor 87 is driven, then the conveying rollers 6, 7 are rotated, and the recording paper P is conveyed in the conveying direction.

The maintenance unit 8 is provided with a cap 71, a suction pump 72, and a waste liquid tank 73. The cap 71 is arranged on the right side in the scanning direction from the platen 5. When the carriage 2 is positioned at the maintenance position disposed on the right side in the scanning direction from the platen 5, the plurality of nozzles 10 is opposed to the cap 71.

Figure 4:
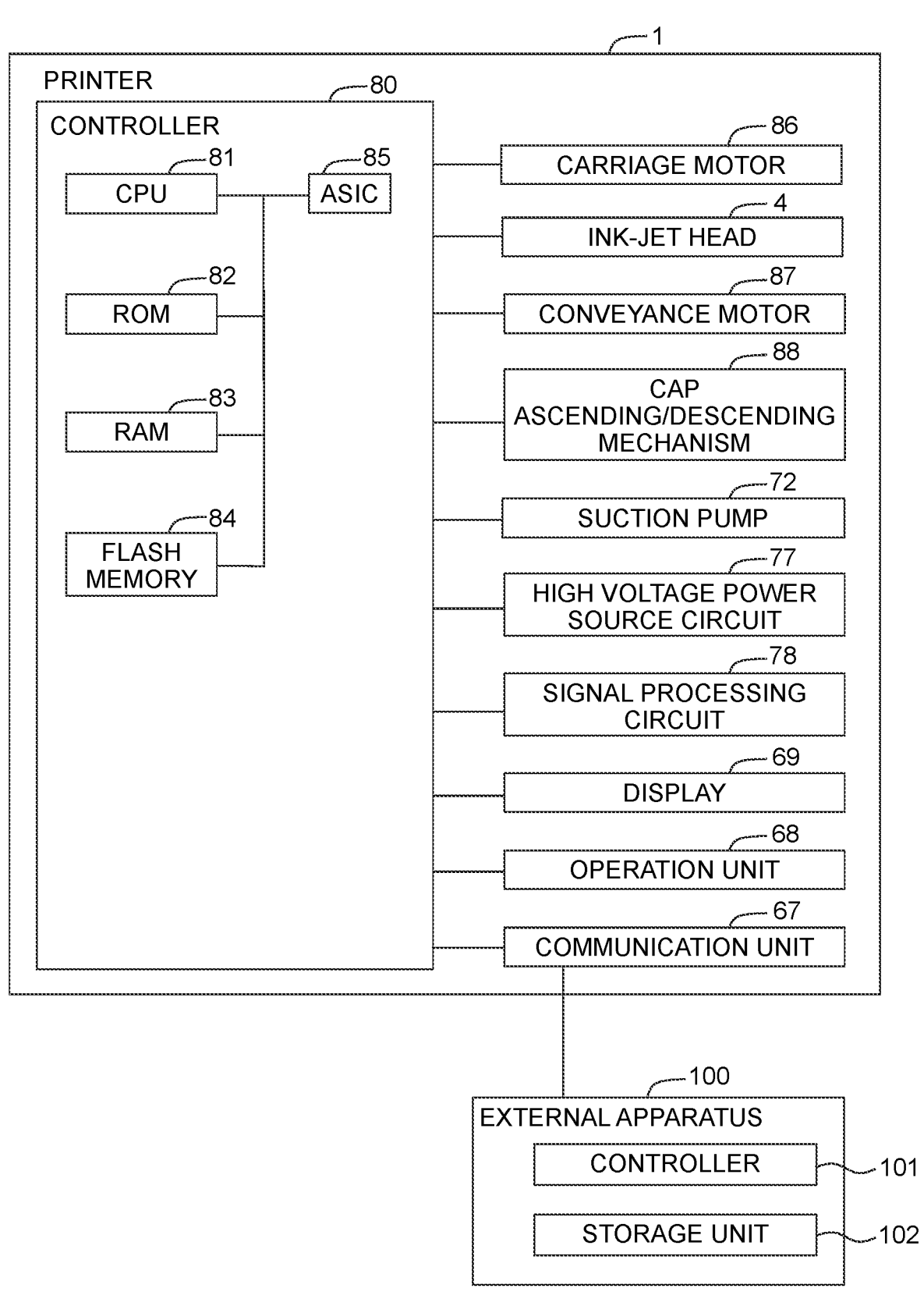
FIG. 4 is a block diagram illustrative of electric configuration of the printer.

Further, the cap 71 is connected to a cap ascending/descending mechanism 88 (see FIG. 4). When the cap ascending/descending mechanism 88 is driven, the cap 71 is moved upwardly/downwardly. When the cap 71 is moved upwardly by means of the cap ascending/descending mechanism 88 in a state in which the plurality of nozzles 10 is opposed to the cap 71 by positioning the carriage 2 at the maintenance position, the upper end portion of the cap 71 is brought in tight contact with the nozzle surface 4a. Accordingly, the capped state is given, in which the plurality of nozzles 10 of the ink-jet head 4 is covered with the cap 71. In a state in which the cap 71 is moved downwardly, the plurality of nozzles 10 is not covered with the cap 71. Note that the cap 71 is not limited to such configuration that the cap 71 covers the plurality of nozzles 10 by being brought in tight contact with the nozzle surface 4a. The cap 71 may cover the plurality of nozzles 10, for example, by being brought in tight contact with an unillustrated frame or the like arranged around the nozzle surface 4a of the ink-jet head 4.

The suction pump 72 is a tube pump or the like which is connected to the cap 71 and the waste liquid tank 73. Then, in the case of the maintenance unit 8, when the suction pump 72 is driven after providing the capped state as described above, it is possible to perform the suction purge ("recovery action" of the present disclosure) in which the inks contained in the ink-jet head 4 are discharged from the plurality of nozzles 10. The inks, which are discharged by the suction purge, are stored in the waste liquid tank 73.

Note that in this section, the explanation has been made for the purpose of convenience assuming that the cap 71 collectively covers all of the nozzles 10, and the inks contained in the ink-jet head 4 are discharged from all of the nozzles 10 in the suction purge. However, there is no limitation thereto. For example, the cap 71 may be distinctly provided with a portion which covers the plurality of nozzles 10 for constructing the nozzle array 9 disposed on the rightmost side for ejecting the black ink, and a portion which covers the plurality of nozzles 10 for constructing the three nozzle arrays 9 disposed on the left side for ejecting the color inks. Any one of the black ink and the color inks contained in the ink-jet head 4 can be selectively discharged in the suction purge. Alternatively, for example, the cap 71 may be provided individually for each of the nozzle arrays 9. The inks can be discharged from the nozzles 10 individually from each of the nozzle arrays 9 in the suction purge.

Further, as depicted in FIG. 2, an electrode 76, which has a rectangular planar shape, is arranged in the cap 71. The electrode 76 is connected to a high voltage power source circuit 77 via a resistor 79. Then, when the driving for inspection is performed as described later on, the high voltage power source circuit 77 applies a predetermined voltage (for example, about 600 V) to the electrode 76. On the other hand, the ink-jet head 4 is retained at the ground electric potential. Accordingly, a predetermined electric potential difference is generated between the ink-jet head 4 and the electrode 76. A signal processing circuit 78 is connected to the electrode 76. The signal processing circuit 78 includes, for example, a differentiating circuit, and the signal processing circuit 78 outputs a signal depending on the voltage of the electrode 76. However, the signal, which is outputted from the signal processing circuit 78, may be a current signal. Note that in the first embodiment, the combination of the electrode 76, the high voltage power source circuit 77, the signal processing circuit 78, and the resistor 79 corresponds to the "signal output unit" of the present disclosure.

In a state in which the voltage is applied to the electrode 76 by means of the high voltage power source circuit 77 after providing the capped state as described above and the driving for inspection described later on is not performed, the voltage of the signal outputted from the signal processing circuit 78 is the voltage VO depicted in FIGS. 3A and 3B.

Further, in the first embodiment, in the state in which the voltage is applied to the electrode 76 by means of the high voltage power source circuit 77 after providing the capped state as described above, it is possible to perform the driving for inspection in order to allow the ink-jet head 4 to eject the inks from the nozzles 10 to the electrode 76.

When the ink is ejected from the nozzles 10 by means of the driving for inspection, the ink, which is ejected from the nozzles 10, is charged. Accordingly, the charged ink approaches the electrode 76, and the electric potential of the electrode 76 changes until the ink is landed on the electrode 76. Then, after the charged ink is landed on the electrode 76, the electric potential of the electrode 76 returns to the electric potential having been provided before the ejection of the ink, while being attenuated.

Figure 3A:
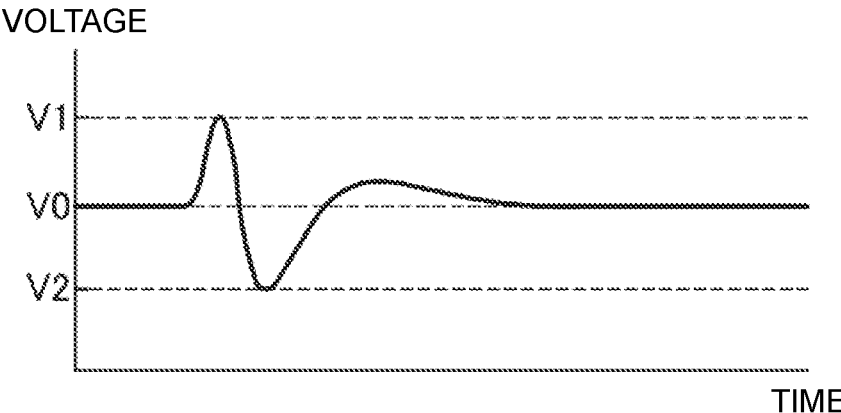
FIG. 3A is a drawing illustrative of a signal outputted from the signal processing circuit when the ink is ejected from the nozzle in accordance with the driving for inspection.

In this situation, the signal, which is outputted from the signal processing circuit 78, behaves as depicted in FIG. 3A such that the voltage is raised from the voltage V0 to the voltage V1 which is larger than the voltage V0. After that, the voltage is lowered to the voltage V2 which is smaller than the voltage V0. After that, the voltage is repeatedly raised and lowered while being attenuated, and the voltage returns to the voltage V0. Accordingly, the signal, which is outputted from the signal processing circuit 78, is the signal in which the maximum value is the voltage V1 and the minimum value is the voltage V2.

Figure 3B:
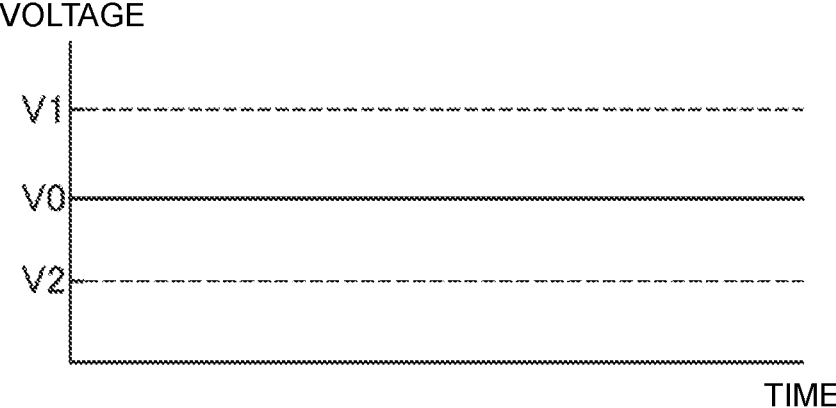
FIG. 3B is a drawing illustrative of a signal outputted from the signal processing circuit when the ink is not ejected from the nozzle in accordance with the driving for inspection.

On the other hand, when the ink is not ejected from the nozzle 10 by means of the driving for inspection, the signal, which is outputted from the signal processing circuit 78, behaves as depicted in FIG. 3B such that the voltage scarcely changes from the voltage V0.

In this way, in the first embodiment, the signal, which is outputted from the signal processing circuit 78, differs depending on whether or not the ink is ejected from the nozzles 10 by means of the driving for inspection. Then, in the first embodiment, this fact is utilized to judge whether or not the ink is ejected normally from the nozzles 10 as described later on.

In this section, the first embodiment has been configured such that the predetermined voltage is applied to the electrode 76, the ink-jet head 4 is retained at the ground electric potential, and the signal processing circuit 78 outputs the signal depending on the voltage of the electrode 76. However, there is no limitation thereto. The following configuration is also available. That is, the electrode 76 is retained at the ground electric potential, and the electric potential difference is generated between the electrode 76 and the ink-jet head 4 by applying the predetermined voltage to the ink-jet head 4. The signal processing circuit 78 is connected to the ink-jet head 4 to output the signal depending on the voltage of the ink-jet head 4.

<Electric Configuration of Printer>

Next, the electric configuration of the printer 1 will be explained. As depicted in FIG. 4, the printer 1 is provided with a controller 80. The controller 80 is composed of, for example, CPU (Central Processing Unit) 81, ROM (Read Only Memory) 82, RAM (Random Access Memory) 83, a flash memory 84 ("memory" of the present disclosure), and ASIC (Application Specific Integrated Circuit) 85. The controller 80 controls the actions or operations of, for example, the carriage motor 86, the ink-jet head 4, the conveyance motor 87, the cap ascending/descending mechanism 88, the suction pump 72, and the high voltage power source circuit 77. Further, the controller 80 receives the signal, for example, from the signal processing circuit 78.

Further, in addition to the constitutive components described above, the printer 1 is provided with a display 69, an operation unit 68, and a communication unit 67. The display 69 is, for example, a liquid crystal display which is provided on the casing of the printer 1. The controller 80 controls the display 69 to display, on the display 69, the information which is required, for example, for the action of the printer 1. The operation unit 68 includes, for example, a button which is provided on the casing of the printer 1 and a touch panel which is provided for the display 69. The operation unit 68 receives the signal based on the operation of the user, and the received signal is transmitted to the controller 80.

The communication unit 67 is connected so that the communication can be made with an external apparatus 100. The external apparatus 100 is, for example, PC, a smartphone or the like. The external apparatus 100 is provided with a controller 101 and a memory 102. The controller 101 is composed of, for example, CPU, ROM, and RAM. The memory 102 is, for example, a flash memory. Further, the communication unit 67 may be communicated with the external apparatus 100 by being connected to the external apparatus 100 in a wired manner, or the communication unit 67 may be communicated with the external apparatus 100 by being connected to the external apparatus 100 in a wireless manner.

Note that as for the controller 80, only CPU 81 may perform various processings, only ASIC 85 may perform various processings, or CPU 81 and ASIC 85 may perform various processings in a cooperating manner. Further, as for the controller 80, one CPU 81 may perform the processing singly, or a plurality of CPUs 81 may perform the processing in a shared manner. Further, as for the controller 80, one ASIC 85 may perform the processing singly, or a plurality of ASICs 85 may perform the processing in a shared manner.

<Process for Nozzle Inspection>

Next, an explanation will be made about a flow of the process to inspect whether or not the plurality of nozzles 10 of the ink-jet head 4 includes abnormal nozzles in the first embodiment. In the first embodiment, the controller 80 performs the process in accordance with the flow depicted in FIG. 5 during the period in which the electric power is supplied to the printer 1, for example, in such a situation that the plug of the printer 1 is connected to a commercial power source.

Figure 5:
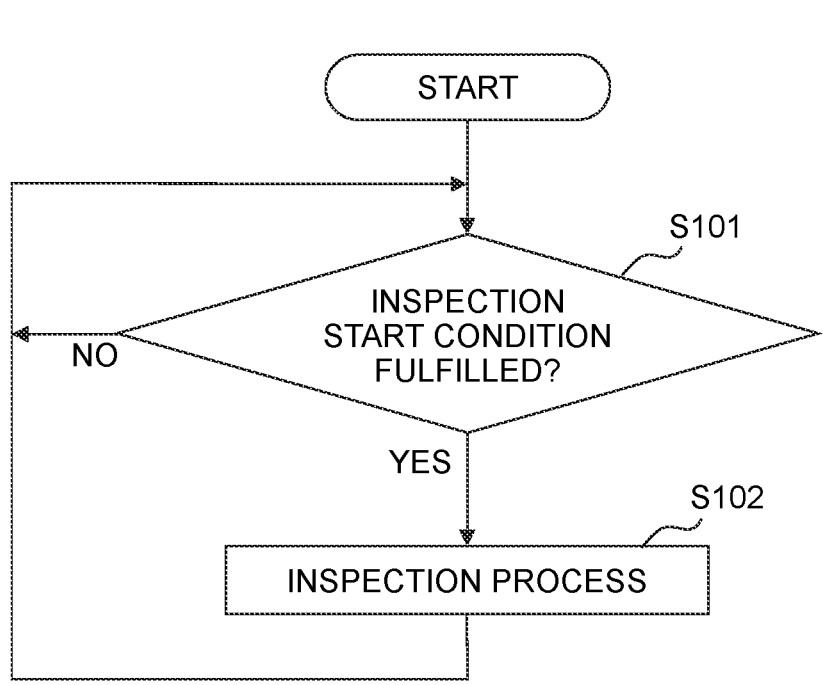
FIG. 5 is a flow chart illustrative of a flow of a process to inspect whether or not the nozzle is an abnormal nozzle.

The flow depicted in FIG. 5 will be explained in detail. The controller 80 judges whether or not the inspection start condition is fulfilled (S101). The inspection start condition includes, for example, a condition in which a predetermined time arrives, a condition in which the number of sheets of the recording paper P subjected to the recording after the previous inspection process arrives at a predetermined number of sheets, and a condition in which any error occurs, for example, such that that the printer 1 is clogged with the recording paper P. In the process of S101, if at least one condition of the foregoing conditions is fulfilled, it is judged that the inspection start condition is fulfilled.

The controller 80 waits during the period in which the inspection start condition is not fulfilled (S101: NO). If the inspection start condition is fulfilled (S101: YES), the inspection process is executed (S102). In the inspection process, the controller 80 brings about the capped state as described above. Further, in a state in which the high voltage power source circuit 77 is allowed to apply the voltage to the electrode 76, the ink-jet head 4 is allowed to perform the driving for inspection for each of the plurality of nozzles 10. Then, the nozzle-information, which is the information to indicate whether or not the nozzle 10 is the abnormal nozzle, is acquired on the basis of the signal outputted from the signal processing circuit 78 when the driving for inspection is performed for each of the nozzles 10. The nozzle-information is stored in the flash memory 84 ("memory" of the present disclosure).

<Process of Transmission and Reception of Abnormal Nozzle-Information>

Figure 6A:
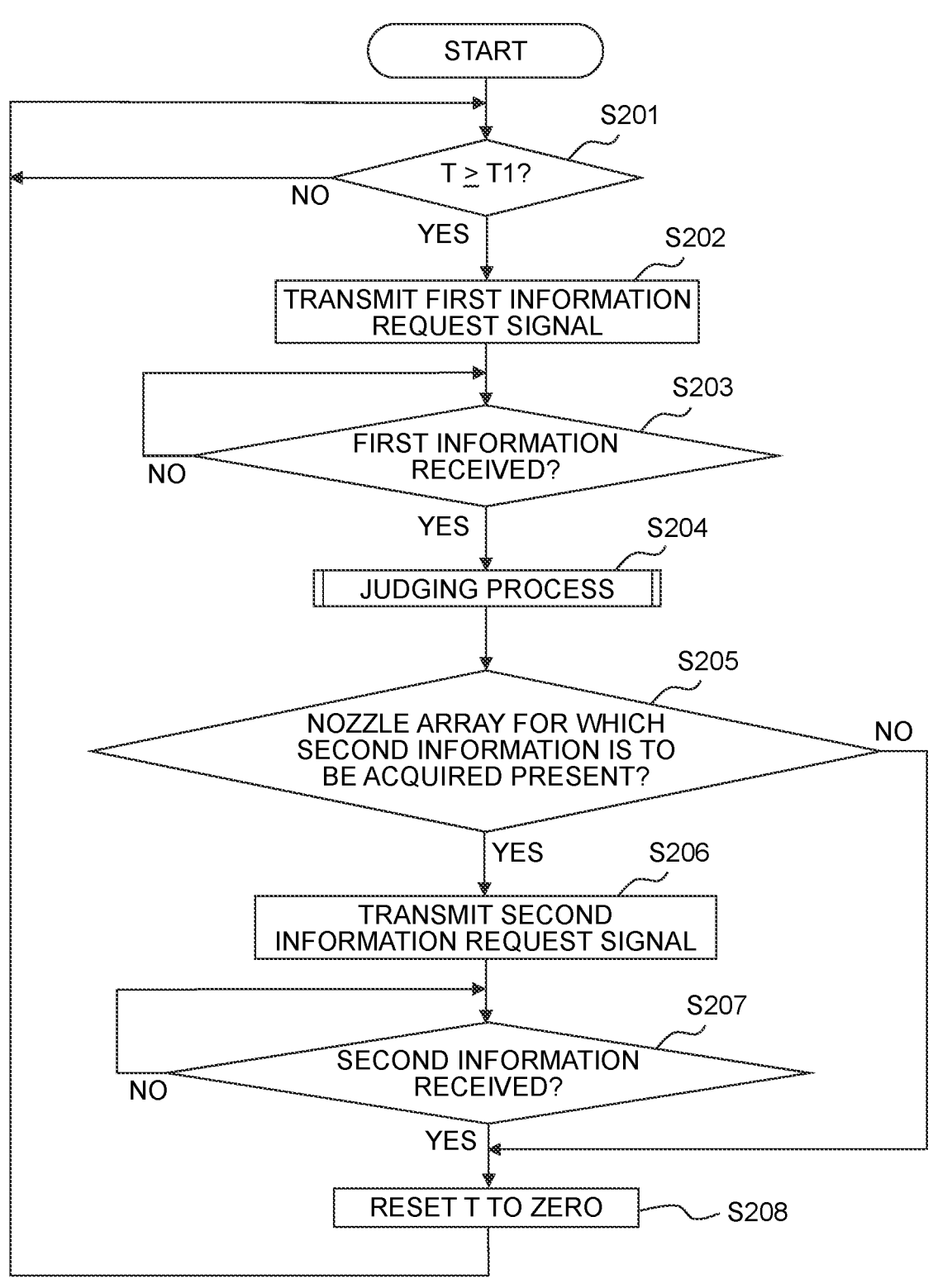
FIG. 6A is a flow chart illustrative of a flow of a process to acquire first information and second information from the printer in relation to an external apparatus.
Figure 6B:
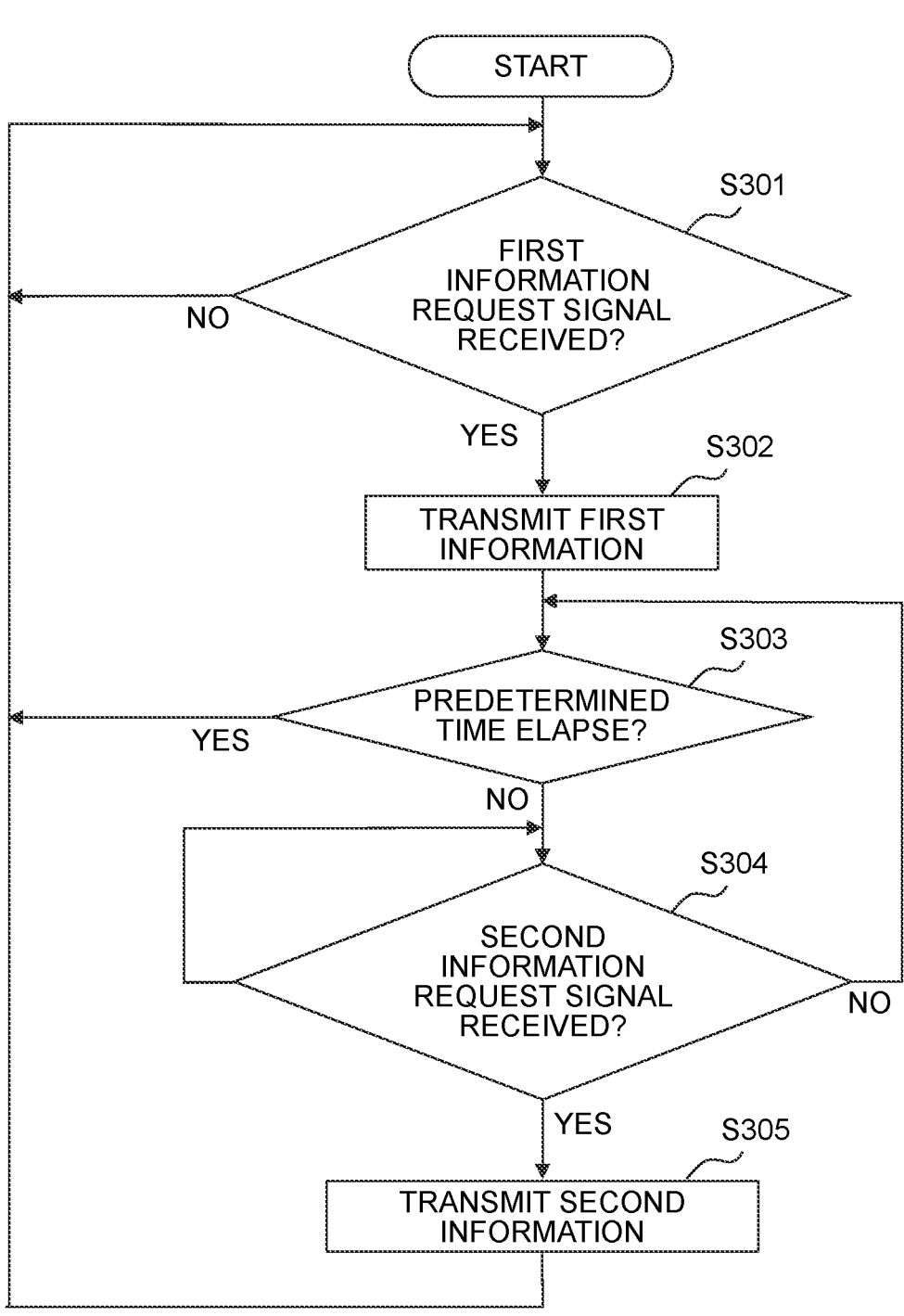
FIG. 6B is a flow chart illustrative of a flow of a process to transmit the first information and the second information to the external apparatus in relation to the printer.

In the first embodiment, the controller 101 of the external apparatus 100 performs the process in accordance with the flow depicted in FIG. 6A, and the controller 80 of the printer 1 performs the process in accordance with the flow depicted in FIG. 6B during the period in which the electric power is supplied to the printer 1, and the printer 1 and the external apparatus 100 can make communication with each other. Accordingly, the first information and the second information are transmitted and received as described later on between the printer 1 and the external apparatus 100. Note that the program, which includes, for example, the program for allowing the controller 101 of the external apparatus 100 to perform the process in accordance with the flow depicted in FIG. 6B and which is provided in order to allow the controller 101 of the external apparatus 100 to perform the process as explained in the following explanation, corresponds to the "program" of the present disclosure.

An explanation will be made in further detail below. As depicted in FIG. 6A, the controller 101 of the external apparatus 100 judges whether or not the elapsed time T is not less than a predetermined time T1 (S201). In this procedure, the elapsed time T is the elapsed time after the execution of the processes of S202 to S208 described later on last time. The elapsed time T is reset to zero in S208 described later on when the electric power is initially supplied to the printer 1.

As depicted in FIG. 6A, the controller 101 of the external apparatus 100 waits during the period in which the elapsed time T is less than the predetermined time T1 (S201: NO). If the elapsed time T is not less than the predetermined time T1 (S201: YES), the first information request signal is transmitted to the printer 1 in order to request the first information (S202). In the first embodiment, the first information is the information which indicates whether or not any abnormal nozzle is present in the plurality of nozzles 10 for forming the nozzle array 9 in relation to each of the nozzle arrays 9.

As depicted in FIG. 6B, the controller 80 of the printer 1 waits until the first information request signal, which is transmitted from the external apparatus 100, is received (S301: NO). If the first information request signal is received (S301: YES), the first information is transmitted to the external apparatus 100 (S302). In this procedure, in the first embodiment, the first information may be the information which is included in the nozzle-information stored in the flash memory 84. Alternatively, the first information may be the information which is generated by the controller 80 of the printer 1 on the basis of the nozzle-information stored in the flash memory 84.

As depicted in FIG. 6A, the controller 101 of the external apparatus 100 waits until the first information, which is transmitted from the printer 1, is received (S203: NO) after the transmission of the first information request signal in the process of 5102. If the first information is received (S203: YES), the judging process is executed (S204). Note that in the first embodiment, the process, in which the first information request signal is transmitted to the controller 80 of the printer 1 in the process of S202 and the first information transmitted from the controller 80 of the printer 1 in S302 in accordance therewith is received, corresponds to the "first acquiring process" of the present disclosure.

Figure 7:
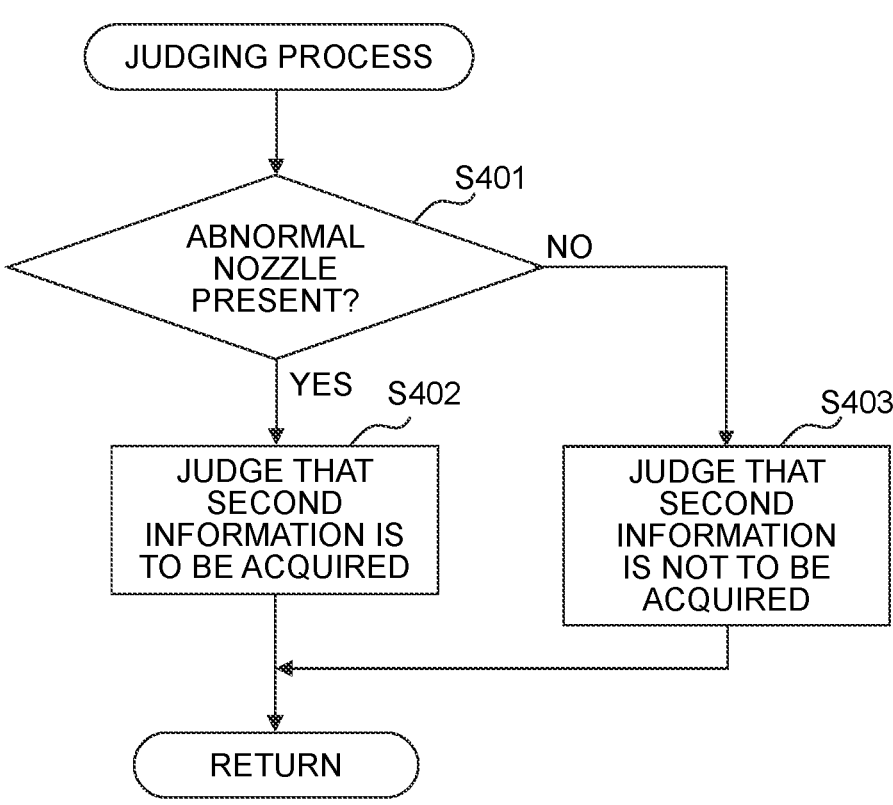
FIG. 7 is a flow chart illustrative of a flow of a judging process of FIG. 6A.

In the judging process, the controller 101 of the external apparatus 100 performs the process in accordance with a flow depicted in FIG. 7 in relation to each of the four nozzle arrays 9. An explanation will be made in more detail below. The controller 101 of the external apparatus 100 judges whether or not any abnormal nozzle is present in the nozzles 10 for forming the nozzle array 9 on the basis of the received first information (S401). If the abnormal nozzle is present (S404: YES), it is judged that the second information of the abnormal nozzle-information is acquired (S402). If the abnormal nozzle is absent (S401: NO), it is judged that the second information is not acquired (S403). The second information is the information to indicate whether or not the nozzle 10 is the abnormal nozzle in relation to each of the plurality of nozzles 10 for forming the nozzle array 9. The second information has the data amount which is larger than that of the first information to indicate whether or not any abnormal nozzle is present in the nozzles 10 for forming the nozzle array 9.

With reference to FIG. 6A again, the controller 101 of the external apparatus 100 judges whether or not the nozzle array 9, for which it is judged to acquire the second information on the basis of the result of the judging process, is present (S205) after the judging process of S204. If the nozzle array 9, for which it is judged to acquire the second information, is absent (S205: NO), then the elapsed time T is reset to zero (S208), and the routine returns to the process of S201. If the nozzle array 9, for which it is judged to acquire the second information, is present (S205: YES), the second information request signal for requesting the second information is transmitted to the controller 80 of the printer 1 (S206) in relation to the plurality of nozzles 10 for forming the nozzle array 9 for which it is judged to acquire the second information.

As depicted in FIG. 6B, the controller 80 of the printer 1 waits until the predetermined time elapses after the transmission of the first information in 5302 or the second information request signal transmitted from the external apparatus 100 is received (S303: NO, S304: NO). Then, if the predetermined time elapses (S303: YES) without receiving the second information request signal (S304: NO), the routine returns to the process of S301. The situation, in which the predetermined time elapses without receiving the second information request signal, is such a situation that the second information request signal is not transmitted from the controller 101 of the external apparatus 100. Further, if the second information request signal is received (S304: YES) until the predetermined time elapses (S303: NO), then the controller 80 of the printer 1 transmits the second information to the external apparatus 100 (S305), and the routine returns to the process of S301.

As depicted in FIG. 6A, the controller 101 of the external space 100 waits until the second information transmitted from the printer 1 is received (S207: NO) after transmitting the second information request signal in F206. If the second information is received (S207: YES), then the elapsed time T is reset to zero (S208), and the routine returns to the process of S201. Note that in the first embodiment, the process, in which the second information request signal is transmitted to the controller 80 of the printer 1 in S206 and the second information transmitted from the controller 80 of the printer 1 in the process of S305 in accordance therewith is received, corresponds to the "second acquiring process" of the present disclosure. Further, when the second information is received, the controller 101 of the external apparatus 100 allows the memory 102 to store the received second information.

<Technical Effect of First Embodiment>

In the first embodiment, the controller 101 of the external apparatus 100 acquires, from the printer 1, the first information which has the data amount smaller than that of the second information. The controller 101 judges whether or not the second information is to be acquired on the basis of the first information. Then, if it is judged that the second information is to be acquired, the second information is acquired from the printer 1. On the other hand, in the printer 1, if the first information request signal is received from the external apparatus 100, the first information, which has the data amount smaller than that of the second information, is transmitted to the external apparatus 100. After that, only when the second information request signal is received from the external apparatus 100, the second information is transmitted to the external apparatus 100. Accordingly, the second information, which has the large data amount, can be transmitted and received between the printer 1 and the external apparatus 100 only when the second information is required. It is possible to maximally suppress the time required for the communication between the printer 1 and the external apparatus 100.

In the first embodiment, the first information is the information relevant to whether or not the abnormal nozzle is present. Therefore, it is possible to adopt such a procedure that the second information, which has the large data amount, is acquired only when the abnormal nozzle is present. It is possible to maximally suppress the time required for the communication between the printer 1 and the external apparatus 100.

In the first embodiment, the first information is the information which is individual or distinct for each of the nozzle arrays 9. Therefore, it is possible to appropriately judge whether or not the second information is to be acquired from the printer 1 on the basis of the first information which is individual or distinct for each of the nozzle arrays 9. Then, it is possible to transmit and receive the second information between the printer 1 and the external apparatus 100 only when the second information is necessary. Accordingly, it is possible to maximally suppress the time required for the communication between the printer 1 and the external apparatus 100.

In the first embodiment, it is judged whether or not the second information is to be acquired individually or distinctly for each of the nozzle arrays 9. Then, only the second information, which relates to the nozzle array 9 judged to acquire the second information, is acquired from the printer 1. Accordingly, when the second information is acquired, it is possible to suppress the time required for the communication between the printer 1 and the external apparatus 100 as compared with a case in which all pieces of the second information relevant to all of the nozzle arrays 9 are always acquired.

In the first embodiment, the second information is the information which indicates whether or not each of the plurality of nozzles 10 of the ink-jet head 4 is the abnormal nozzle. The second information has the large data amount. In view of the above, in the first embodiment, as described above, the external apparatus 100 acquires the second information from the printer 1 only when the second information is required. Thus, it is possible to maximally suppress the time required for the communication between the printer 1 and the external apparatus 100.

In the first embodiment, the external apparatus 100 acquires the first information from the printer 1 every time when the predetermined time T1 elapses. The second information is acquired from the printer 1 only when it is judged that the second information is required on the basis of the first information. Accordingly, it is possible to suppress the time required for the communication between the printer 1 and the external apparatus 100 as compared with a case in which the external apparatus 100 acquires the second information from the printer 1 every time when the predetermined time T1 elapses.

SECOND EMBODIMENT

Next, a second embodiment of the present disclosure will be explained. The second embodiment also relates to the printer 1 and the external apparatus 100 which are the same as or equivalent to those of the first embodiment. However, in the second embodiment, the first information and the flow of the judging process are different from those of the first embodiment.

In the second embodiment, the first information is the information relevant to the number of abnormal nozzles in relation to each of the nozzle arrays 9. Further, also in the second embodiment, the second information is the information to indicate whether or not each of the plurality of nozzles 10 for forming the nozzle array 9 is the abnormal nozzle. On this account, the second information has the data amount which is larger than that of the first information. Note that also in the second embodiment, the first information may be the information which is included in the nozzle-information stored in the flash memory 84 of the printer 1, or the first information may be the information which is generated by the controller 80 of the printer 1 on the basis of the nozzle-information stored in the flash memory 84.

In the second embodiment, in the judging process, the controller 101 of the external apparatus 100 performs the process in accordance with the flow depicted in FIG. 7 for each of the four nozzle arrays 9. The process is performed in accordance with the flow depicted in FIG. 8A. In the flow depicted in FIG. 8A, the process of S401 of the flow depicted in FIG. 7 is replaced with the process of S501.

In the process of S501, the controller 101 of the external apparatus 100 judges whether or not the number of abnormal nozzles relevant to the nozzle array 9 is not less than a threshold value on the basis of the received first information. In this procedure, in the second embodiment, as depicted in FIG. 8B, the threshold values Hk, Hy, Hc, Hm are set for each of the colors of the inks to be ejected, i.e., individually for each of the nozzle arrays 9. As for the threshold values Hk, Hy, Hc, Hm, all of the values thereof may be different from each other, one value or two or three values may be identical with each other, or all of the values may be identical with each other.

If the number of abnormal nozzles of the nozzle array 9 is not less than the threshold value (S501: YES), the controller 101 of the external apparatus 100 judges that the second information is to be acquired (S402). If the number of abnormal nozzles of the nozzle array 9 is less than the threshold value (S501: NO), the controller 101 of the external apparatus 100 judges that the second information is not to be acquired (S403).

<Technical Effect of Second Embodiment>

In the second embodiment, it is possible to adopt such a procedure that the second information, which has the large data amount, is transmitted and received between the printer 1 and the external apparatus 100 only when the number of abnormal nozzles is large. Therefore, it is possible to maximally suppress the time required for the communication between the printer 1 and the external apparatus 100.

Further, in the second embodiment, the threshold value is set individually for each of the nozzle arrays 9. It is judged whether or not the second information is to be acquired on the basis of the number of abnormal nozzles in relation to each of the nozzle arrays 9. Accordingly, it is possible to appropriately judge whether or not the second information is to be acquired depending on, for example, the characteristic of the ink ejected from the nozzle 10 in relation to each of the nozzle arrays 9.

THIRD EMBODIMENT

A third embodiment of the present disclosure will be explained. The third embodiment also relates to the printer 1 and the external apparatus 100 which are the same as or equivalent to those of the first and second embodiments. However, in the third embodiment, the first information and the flow of the judging process are different from those of the first and second embodiments.

In the third embodiment, the first information is the information relevant to the number of abnormal nozzles and the number of unrecoverable nozzles which cannot be recovered by the suction purge in relation to each of the nozzle arrays 9. The first information, which relates to the number of abnormal nozzles and the number of unrecoverable nozzles, may be the information which includes the information about the number of abnormal nozzles and the information about the number of unrecoverable nozzles. Alternatively, the first information may be any distinct information corresponding to the number of abnormal nozzles and the number of unrecoverable nozzles, including, for example, the information about the number obtained by subtracting the number of unrecoverable nozzles from the number of abnormal nozzles. Further, for example, when the nozzle-information is stored in the flash memory 84 in the inspection process, the controller 80 of the printer 1 judges whether or not the abnormal nozzle is the unrecoverable nozzle on the basis of whether or not the nozzle, which is judged to be the abnormal nozzle in the present inspection process, is judged to be the abnormal nozzle in all of the continuous inspection processes of not less than a predetermined number including the present inspection process.

Also in the third embodiment, the second information is the information to indicate whether or not each of the plurality of nozzles 10 for forming the nozzle array 9 is the abnormal nozzle. On this account, the second information has the data amount which is larger than that of the first information. Note that also in the third embodiment, the first information may be the information which is included in the nozzle-information stored in the flash memory 84 of the printer 1, or the first information may be the information which is generated by the controller 80 of the printer 1 on the basis of the nozzle-information stored in the flash memory 84.

Figure 9A:
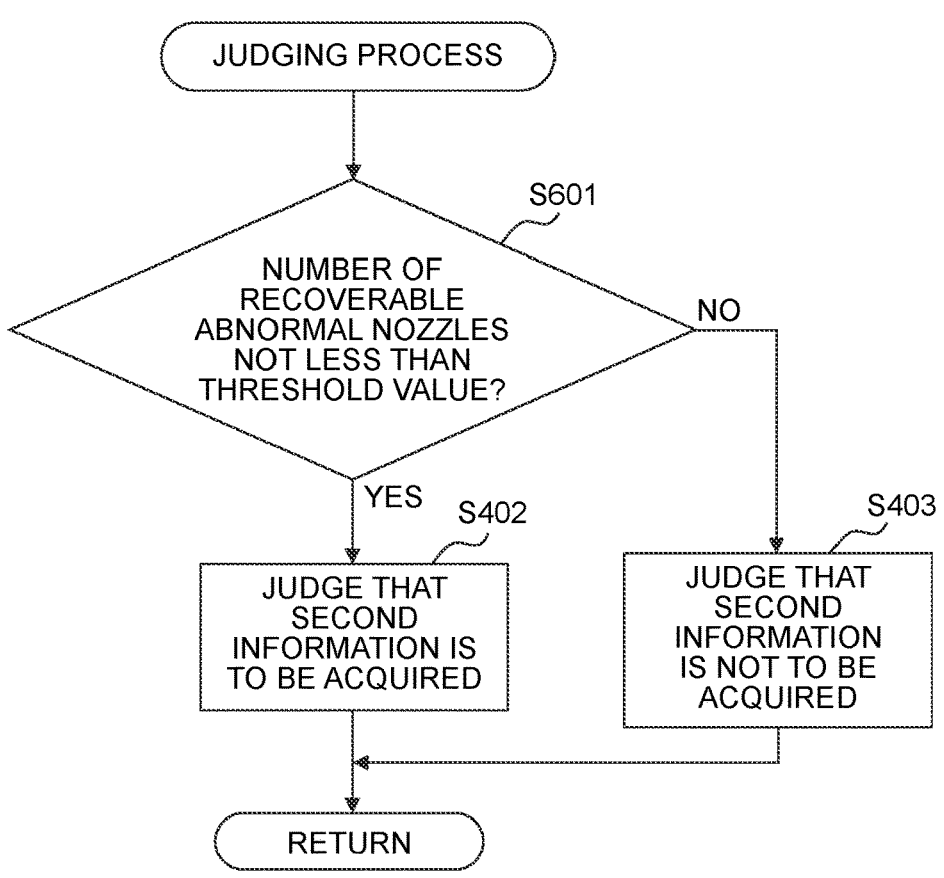
FIG. 9A is a flow chart illustrative of a flow of a judging process of, and FIG. 9B is a flow chart illustrative of a flow of a judging process.

In the third embodiment, in the judging process, the controller 101 of the external apparatus 100 performs the process in accordance with the flow depicted in FIG. 9A for each of the four nozzle arrays 9. In the flow depicted in FIG. 9A, the process of S401 of the flow depicted in FIG. 7 is replaced with the process of S601.

In the process of S601, the controller 101 of the external apparatus 100 judges whether or not the number (hereinafter referred to as "number of recoverable nozzles"), which is obtained by subtracting the number of unrecoverable nozzles from the number of abnormal nozzles in the nozzle array 9, is not less than a threshold value on the basis of the received first information. Further, also in the third embodiment, the threshold value is set individually for each of the colors of the inks to be ejected, i.e., for each of the nozzle arrays 9 in the same manner as the second embodiment.

If the number of recoverable nozzles of the nozzle array 9 is not less than the threshold value (S601: YES), the controller 101 of the external apparatus 100 judges that the second information is to be acquired (S402). If the number of recoverable nozzles of the nozzle array 9 is less than the threshold value (S601: NO), the controller 101 of the external apparatus 100 judges that the second information is not to be acquired (S403).

<Technical Effect of Third Embodiment>

In the third embodiment, it is possible to adopt such a procedure that the second information, which has the large data amount, is transmitted and received between the printer 1 and the external apparatus 100 only when the number (number of recoverable nozzles), which is obtained by subtracting the number of unrecoverable nozzles from the number of abnormal nozzles, is large. Therefore, it is possible to maximally suppress the time required for the communication between the printer 1 and the external apparatus 100.

In the third embodiment, the threshold value is set individually for each of the nozzle arrays 9, and it is judged whether or not the second information is to be acquired on the basis of the number of recoverable nozzles in relation to each of the nozzle arrays 9. Accordingly, it is possible to adequately judge whether or not the second information is to be acquired depending on, for example, the characteristic of the ink ejected from the nozzle 10 in relation to each of the nozzle arrays 9.

FOURTH EMBODIMENT

A fourth embodiment of the present disclosure will be explained. The fourth embodiment also relates to the printer 1 and the external apparatus 100 which are the same as or equivalent to those of the first to third embodiments. However, in the fourth embodiment, the first information and the flow of the judging process are different from those of the first to third embodiments.

In the fourth embodiment, the first information is the information to indicate whether or not the nozzle-information, which is stored in the flash memory 84 at present in relation to each of the nozzle arrays 9, is updated from the information which was stored in the flash memory 84 when the controller 80 of the printer 1 transmitted the second information to the external apparatus 100 last time. Further, also in the fourth embodiment, the second information is the information to indicate whether or not each of the plurality of nozzles 10 for forming the nozzle array 9 is the abnormal nozzle. On this account, the second information has the data amount which is larger than that of the first information.

In the fourth embodiment, when the nozzle-information is stored in the inspection process of S102, the controller 80 of the printer 1 stores, in the flash memory 84, the first information which indicates whether or not the nozzle-information to be stored this time is updated from the nozzle-information stored when the second information was transmitted to the external apparatus 100 last time. Then, in the process of S302, the controller 80 of the printer 1 transmits the stored first information to the external apparatus 100.

Figure 9B:
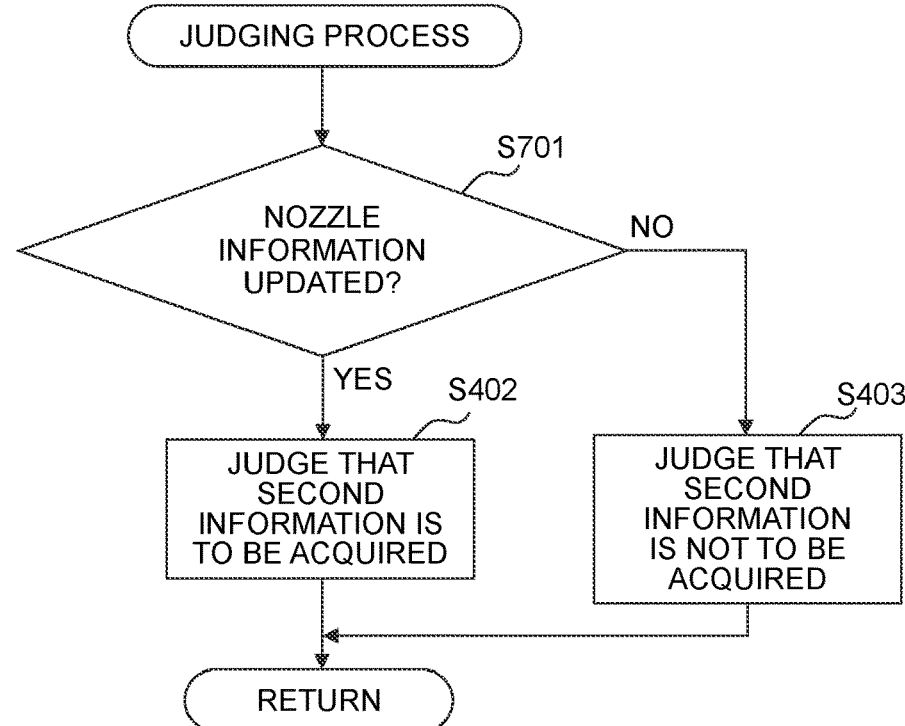

In the fourth embodiment, in the judging process, the controller 101 of the external apparatus 100 performs the process in accordance with the flow depicted in FIG. 9B for each of the four nozzle arrays 9. In the flow depicted in FIG.

9B, the process of S401 of the flow depicted in FIG. 7 is replaced with the process of S701.

In the process of S701, the controller 101 of the external apparatus 100 judges whether or not the nozzle-information is updated from the nozzle-information stored when the controller 80 of the printer 1 transmitted the second information last time, on the basis of the received first information. If the nozzle-information is updated from the nozzle-information which was stored when the controller 80 of the printer 1 transmitted the second information last time (S701: YES), the controller 101 of the external apparatus 100 judges that the second information is to be acquired (S402). If the nozzle-information is not updated from the nozzle-information which was stored when the controller 80 of the printer 1 transmitted the second information last time (S701: NO), the controller 101 of the external apparatus 100 judges that the second information is not to be acquired (S403).

<Technical Effect of Fourth Embodiment>

Even when the second information is acquired in such a situation that the nozzle-information, which is stored in the flash memory 84 of the printer 1, is not updated from the nozzle-information which was stored when the controller 80 of the printer 1 transmitted the information last time, the same second information as that acquired last time is acquired. Any unnecessary communication is generated between the printer 1 and the external apparatus 100. In the fourth embodiment, the first information is the information to indicate whether or not the nozzle-information, which is stored in the flash memory 84 of the printer 1, is updated from the nozzle-information which was stored when the controller 80 of the printer 1 transmitted the second information last time. Only when the nozzle-information is updated from the nozzle-information which was stored when the controller 80 of the printer 1 transmitted the second information last time, the second information having the large data amount is acquired. Accordingly, it is possible to maximally suppress the time required for the communication between the printer 1 and the external apparatus 100.

FIFTH EMBODIMENT

A fifth embodiment of the present disclosure will be explained. The fifth embodiment also relates to the printer 1 and the external apparatus 100 which are the same as or equivalent to those of the first embodiment. In the fifth embodiment, when the recording is performed on the recording paper P by using the printer 1, the first information and the second information are transmitted and received between the controller 80 of the printer 1 and the controller 101 of the external apparatus 100.

Figure 10A:
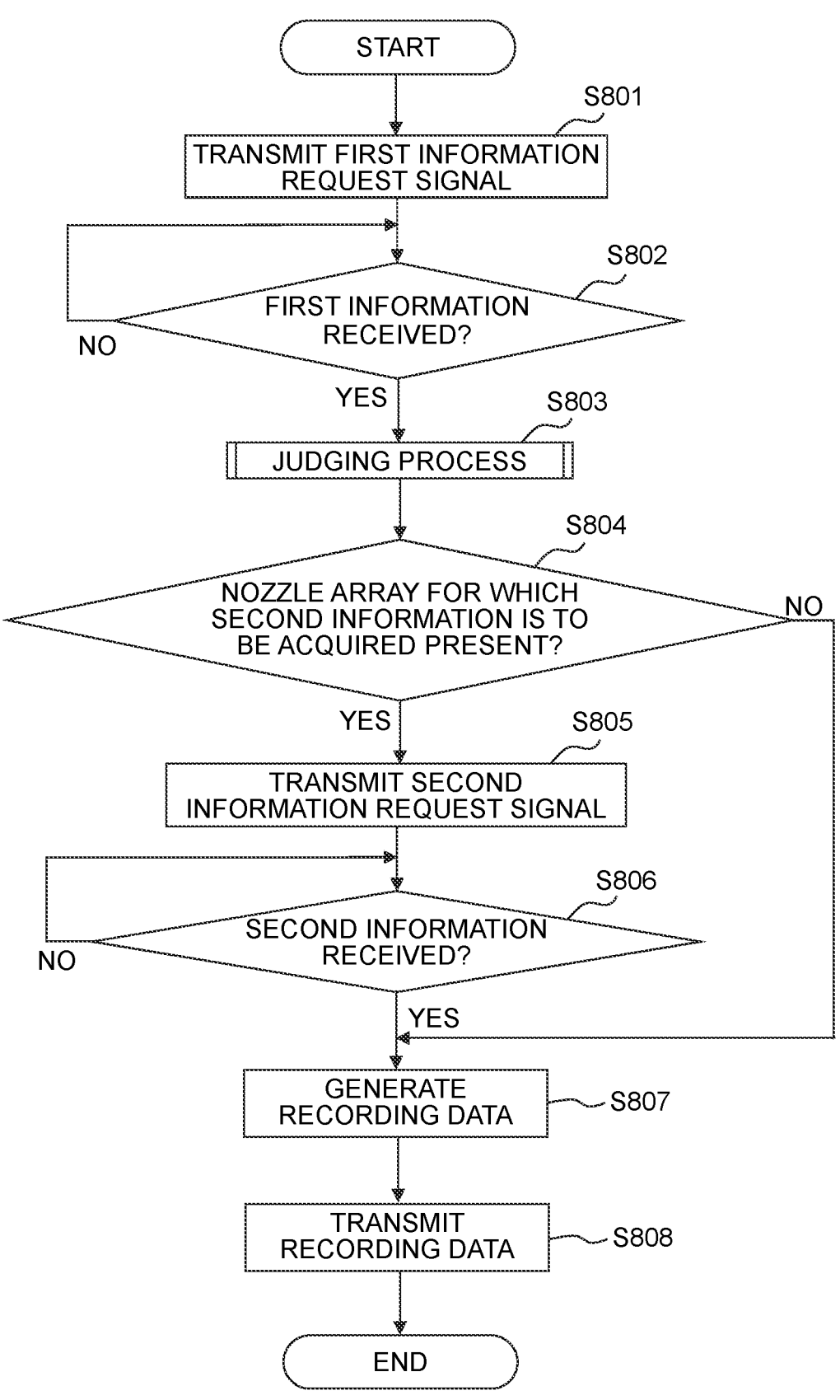
FIG. 10A is a flow chart illustrative of a flow of a process in the external apparatus when the recording is performed.

An explanation will be made in more detail below. When the controller 101 of the external apparatus 100 receives the recording command ("instruction signal" of the present disclosure) to instruct the printer 1 to perform the recording on the recording paper P, the flow depicted in FIG. 10A is started. In this procedure, when the operation is performed by the user by using the external apparatus 100 to instruct the printer 1 to perform the recording on the recording paper P, then the recording command is transmitted from the operation unit 68 to the controller 80, and the controller 80 receives the recording command. Further, in this situation, the controller 101 of the external apparatus 100 receives the image data of the image to be recorded subsequently to the recording command.

Figure 10B:
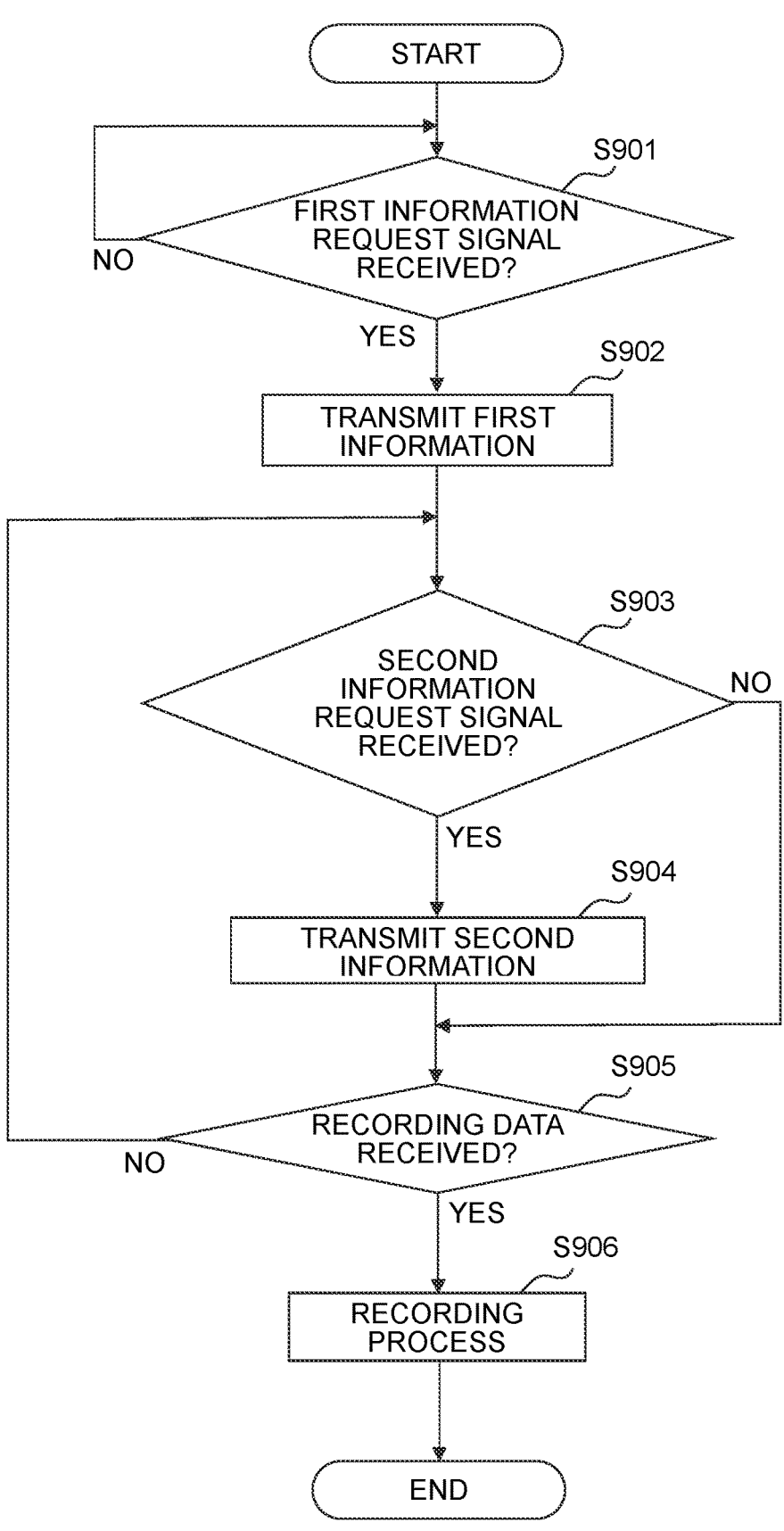
FIG. 10B is a flow chart illustrative of a flow of a process in the printer when the recording is performed.

When the flow depicted in FIG. 10A is started, the controller 101 of the external apparatus 100 transmits the first information request signal to the controller 80 of the printer 1 in the same manner as the process of S202 of the first embodiment (S801). As depicted in FIG. 10B, the controller 80 of the printer 1 executes the processes of S901 and S902 in the same manner as the processes of S301 and S302 of the first embodiment.

As depicted in FIG. 10A, the controller 101 of the external apparatus 100 executes the processes of S802 to S806 in the same manner as the processes of S203 to S207 of the first embodiment after the first information request process of S801. Accordingly, also in the fifth embodiment, if the nozzle array 9, for which it is judged to acquire the second information in the judging process, is present (S804: YES), the controller 101 of the external apparatus 100 transmits the second information request signal to the judging unit 80 of the printer 1 (S805).

As depicted in FIG. 10B, if the second information request signal, which is transmitted from the external apparatus 100, is received (S903: YES) after the transmission of the first information in the process of S902, the controller 80 of the printer 1 transmits the second information to the controller 101 of the external apparatus 100 (S904).

On the other hand, in the fifth embodiment, if the nozzle array 9, for which it is judged in the process of S804 to acquire the second information, is absent (S804: NO), and if the second information, which is transmitted from the printer 1, is received in the process of S806 (S806: YES), then the controller 101 of the external apparatus 100 generates the recording data ("ejection data" of the present disclosure) (S807, "generating process" of the present disclosure). The recording data includes the data which is provided to allow the ink-jet head 4 to eject the inks from the plurality of nozzles 10 in the recording pass described later on, and the data which indicates the conveyance amount of the recording paper P in the conveyance action described later on.

If the nozzle array 9, for which it is judged to acquire the second information, is absent (S804: NO), i.e., if the recording data is generated without acquiring the second information, then the controller 101 of the external apparatus 100 generates the recording data on the basis of the image data. In this procedure, the controller 101 of the external apparatus 100 performs the image processing for the image data including, for example, the process for color conversion from the RGB system to the KYCM system.

Alternatively, when the recording data is generated without acquiring the second information, the controller 101 of the external apparatus 100 may generate the recording data on the basis of the image data and the second information acquired, for example, when the recording was performed in the past. In this case, for example, the controller 101 of the external apparatus 100 generates the recording data by setting the correspondence between the nozzle 10 and the dot formed on the recording paper P depending on the distribution of the abnormal nozzles, in addition to the execution of the image processing described above.

If the recording data is generated after receiving the second information (S806: YES), the controller 101 of the external apparatus 100 generates the recording data on the basis of the image data and the second information received this time.

The controller 101 of the external apparatus 100 generates the recording data in S807, and then the controller 101 transmits the generated recording data to the controller 80 of the printer 1 (S808, "transmitting process" of the present disclosure). The controller 80 of the printer 1 executes the recording process (S906) if the recording data is received (S905: YES) without receiving the second information request signal (S903: NO), or if the recording data is received (S905: YES) after transmitting the second information in the process of S904.

In the recording process, the recording is performed on the recording paper P by repeatedly performing the recording pass in which the ink-jet head 4 is allowed to eject the inks from the plurality of nozzles 10 on the basis of the recording data while moving the carriage 2 in the scanning direction by controlling the carriage motor 86, and the conveyance action in which the conveying rollers 6, 7 are allowed to convey the recording paper P by the conveyance amount indicated by the recording data by controlling the conveyance motor 87.

Figure 11A:
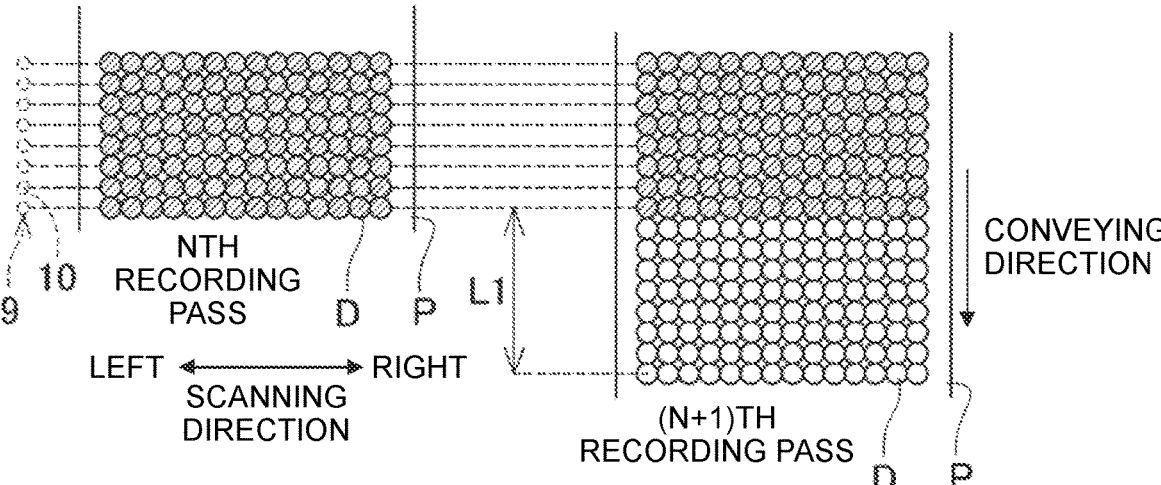
FIG. 11A is a drawing to explain generation of the recording data when the abnormal nozzle is absent.

An explanation will now be made briefly about the recording data generated in the process of S807. For example, if the abnormal nozzle is absent, each of the plurality of nozzles 10 for forming the nozzle array 9 is allotted to any one of the dots D formed in each of the recording passes as depicted in FIG. 11A in the Nth recording pass and the (N+1)th recording pass. Further, the conveyance amount of the recording paper P, which is provided in the conveyance action between the Nth recording pass and the (N+1)th recording pass, is set to the conveyance amount L1 corresponding to the length of the nozzle array 9 in the conveying direction.

Figure 11B:
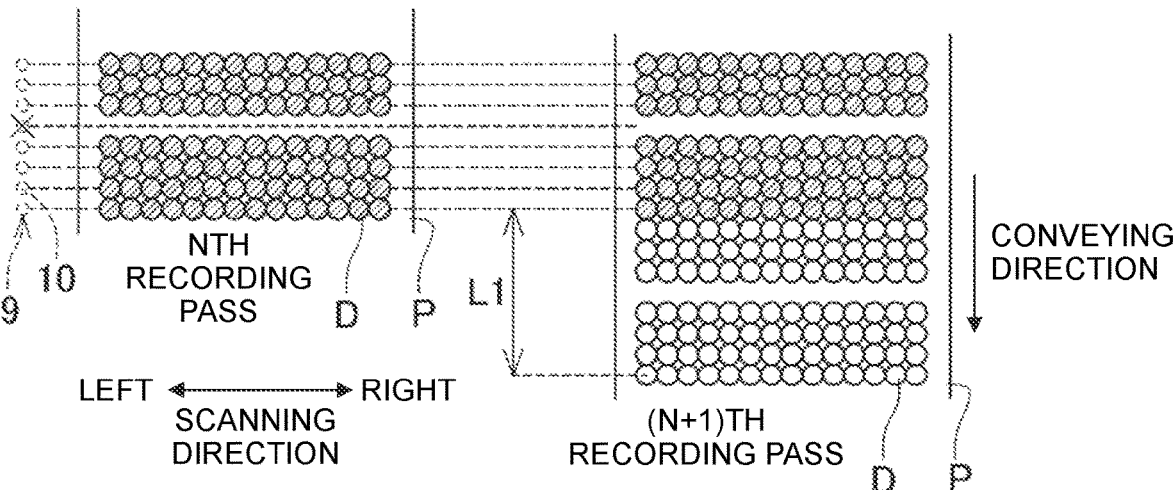
FIG. 11B is a drawing to explain a case in which the recording data is generated when the abnormal nozzle is present in the same manner as when the abnormal nozzle is absent.
Figure 11C:
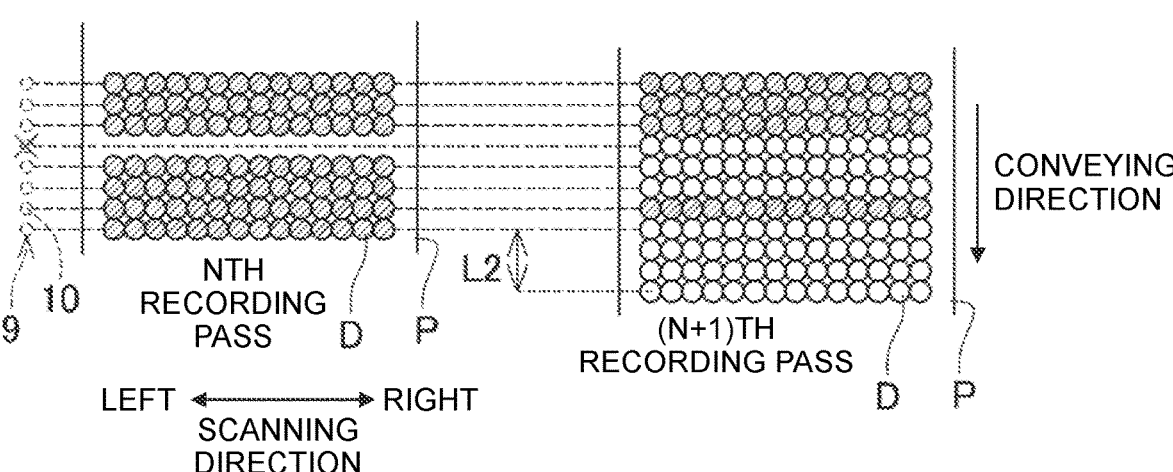
FIG. 11C is a drawing to explain generation of the recording data when the abnormal nozzle is present.

Note that in the drawings to show the Nth recording passes in FIGS. 11A to 11C, the hatched dots D indicate the dots D formed in the Nth recording pass. Further, in the drawings to show the (N+1)th recording passes in FIGS. 11A to 11C, the hatched dots D indicate the dots D formed in the (N+1)th recording pass, and the unhatched dots D indicate the dots D formed in the Nth recording pass.

On the other hand, if the abnormal nozzle is present, the dots D corresponding to the abnormal nozzle are not recorded, if each of the plurality of nozzles 10 for forming the nozzle array 9 is allotted to any one of the dots D formed in each of the recording passes in the Nth recording pass and the (N+1)th recording pass in the same manner as described above, and the conveyance amount of the recording paper P, which is provided in the conveyance action between the Nth recording pass and the (N+1)th recording pass, is set to L1. Note that, the nozzles 10, which are affixed with cross marks in FIGS. 11B and 11C, are the abnormal nozzles.

In view of the above, in the fifth embodiment, if any abnormal nozzle is present, for example, as depicted in FIG. 11C, only the nozzle 10, which is not the abnormal nozzle and which is included in the plurality of nozzles 10 for forming the nozzle arrays 9 in the Nth recording pass and the (N+1)th recording pass, is allotted to any one of the dots D to be formed in each of the recording passes. Further, the conveyance amount of the recording paper P, which is provided in the conveyance action between the Nth recording pass and the (N+1)th recording pass, is set to the conveyance amount L2 which is shorter than the conveyance amount L1.

In this way, if the abnormal nozzle is present, the recording data is generated, wherein the dots D, which correspond to the abnormal nozzle when the dots D are allotted to each of the plurality of nozzles 10 for forming the nozzle array 9 as depicted in FIG. 11B, are complemented so that the dots D are formed by ejecting the ink from the distinct nozzle 10. Note that the allotment of the nozzle 10 to the dots D as depicted in FIGS. 11A to 11C and the conveyance amount of the recording paper P in the conveyance action are described by way of example. The present disclosure is not limited thereto.

<Technical Effect of Fifth Embodiment>

In the fifth embodiment, the controller 101 of the external apparatus 100 acquires the second information from the printer 1 before generating the recording data only when it is necessary to acquire the second information in order to generate the recording data. The recording data is generated on the basis of the acquired second information. Accordingly, if it is unnecessary to acquire the second information in order to generate the recording data, the recording data can be generated without acquiring the second information. As a result, it is possible to maximally suppress the time required for the communication between the printer 1 and the external apparatus 100 as compared with a case in which the second information is acquired every time before generating the recording data.

In the fifth embodiment, when the recording data is generated after receiving the second information, the recording data is generated such that the dots, which correspond to the abnormal nozzle, are complemented so that the dots are formed by ejecting the ink from the nozzle 10 which is not the abnormal nozzle. Accordingly, even when the abnormal nozzle is present upon the recording on the recording paper P, it is possible to form the dots on the recording paper P in the same manner as a case in which the abnormal nozzle is absent.

SIXTH EMBODIMENT

Next, a sixth embodiment of the present disclosure will be explained. The sixth embodiment also relates to the printer 1 and the external apparatus 100 in the same manner as the first embodiment. Further, in the sixth embodiment, the controller 101 of the external apparatus 100 performs the process in accordance with the flow depicted in FIG. 12A, and the controller 80 of the printer 1 performs the process in accordance with the flow depicted in FIG. 12B. Accordingly, when the recording is performed on the recording paper P by means of the printer 1, the first information and the second information are transmitted and received between the controller 80 of the printer 1 and the controller 101 of the external apparatus 100.

Figure 12A:
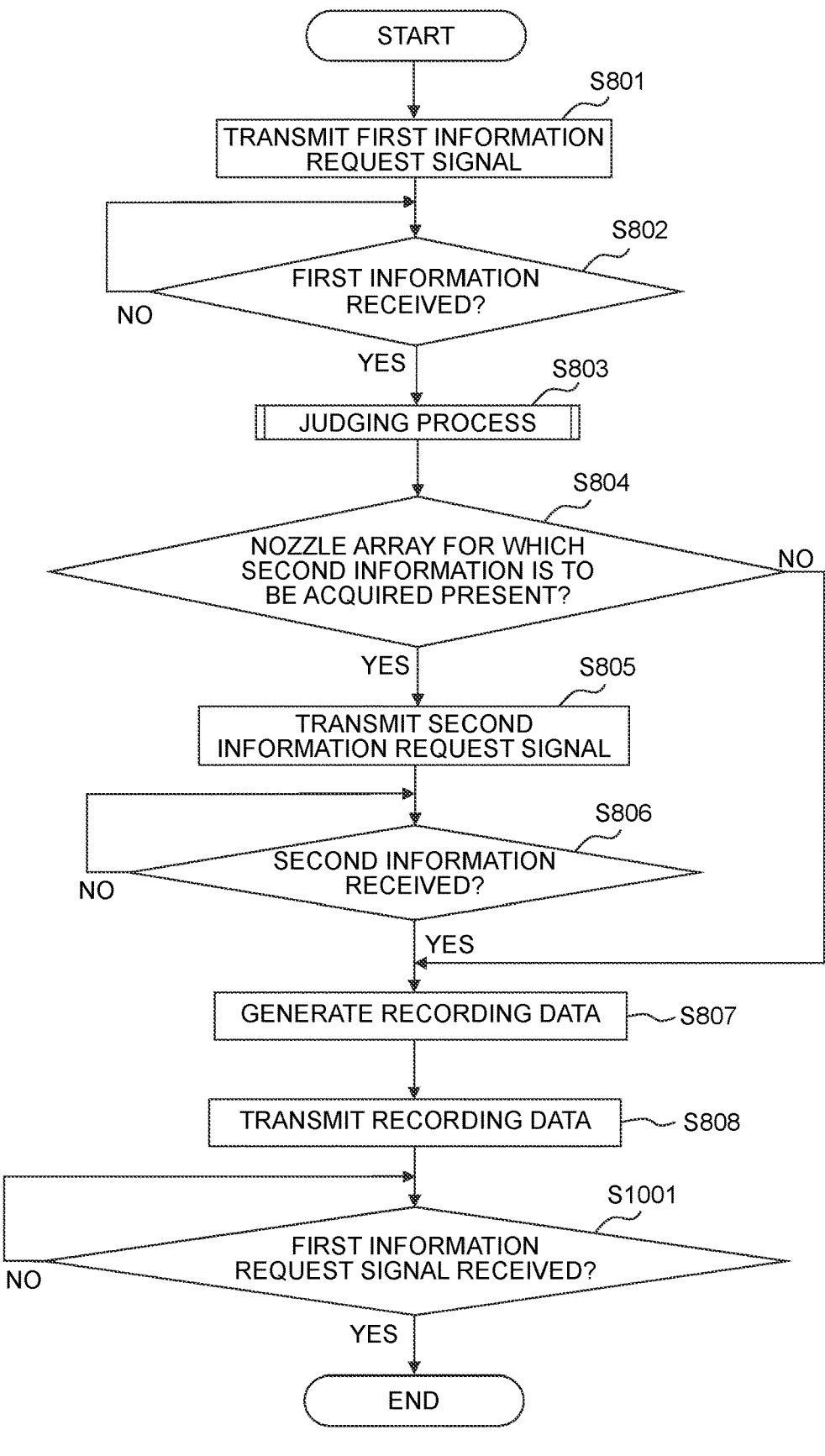
FIG. 12A is a flow chart illustrative of a flow of a process in the external apparatus when the recording is performed.

The flow depicted in FIG. 12A is started when the controller 101 of the external apparatus 100 receives the recording command. Then, when the recording command is received, the controller 101 of the external apparatus 100 executes the processes of 5801 to S808 in the same manner as the fifth embodiment. Further, corresponding thereto, as depicted in FIG. 12B, the controller 80 of the printer 1 executes the processes of S901 to S906 in the same manner as the fifth embodiment.

Figure 12B:
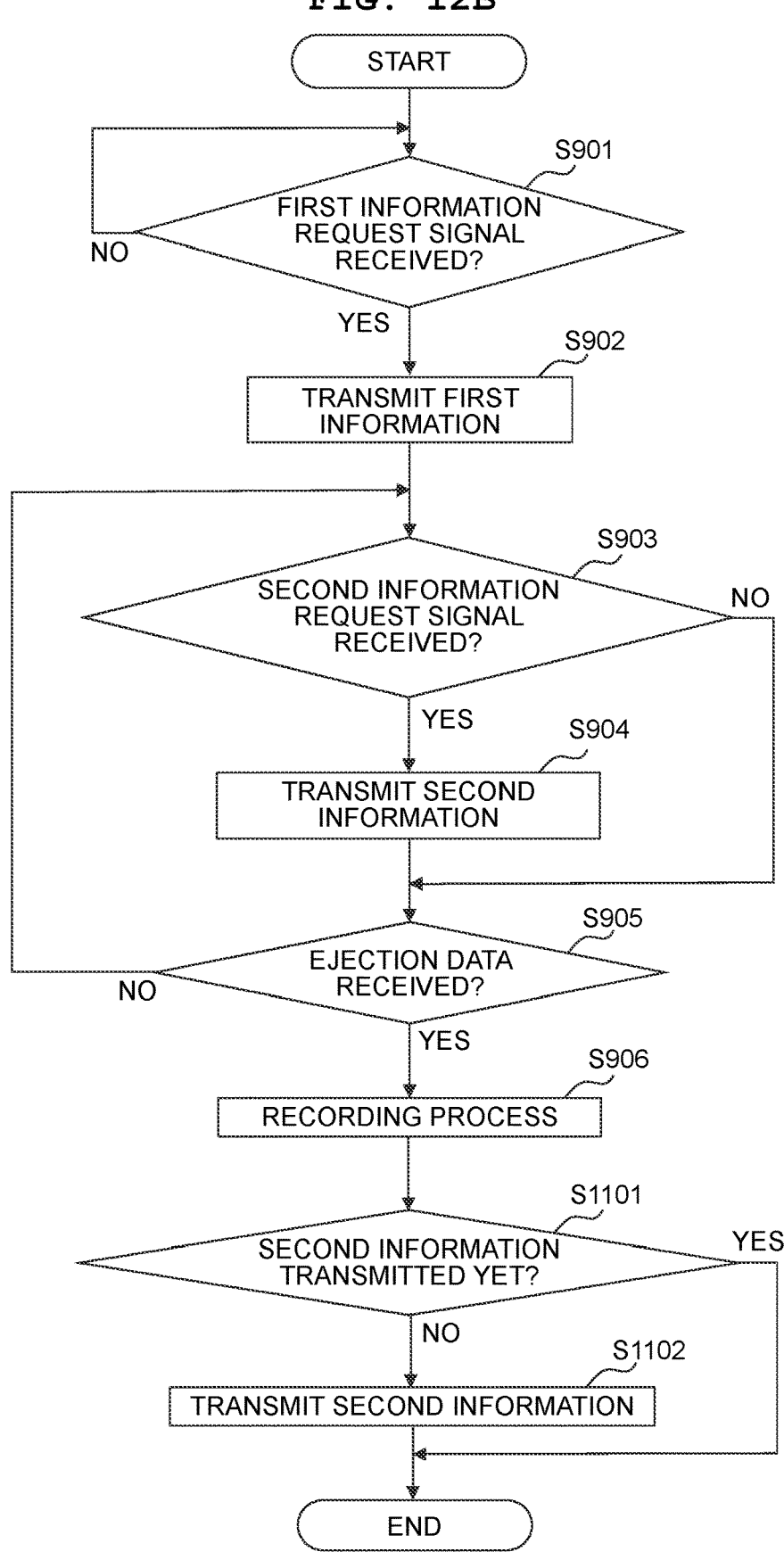
FIG. 12B is a flow chart illustrative of a flow of a process in the printer when the recording is performed.

Then, as depicted in FIG. 12B, the controller 80 of the printer 1 judges whether or not the second information was already transmitted to the external apparatus 100 after the recording process of S906 (S1101). That is, it is judged whether the recording process of S906 was executed after transmitting the second information in the process of S904, or the recording process of S906 was executed without transmitting the second information in the process of S904. If the second information was already transmitted to the external apparatus 100 (S1101: YES), the process is terminated. If the second information was not transmitted yet to the external apparatus 100 (S1101: NO), then the controller 80 of the printer 1 transmits the second information to the external apparatus 100 (S1102), and the process is terminated.

As depicted in FIG. 12A, the controller 101 of the external apparatus 100 waits until the second information is already received (S1001: NO) after transmitting the recording data in the process of S808. If the second information was already received (S1001: YES), the process is terminated. Accordingly, the process is immediately terminated if the second information has been received in the process of S806. On the other hand, if the second information request signal is not transmitted in the process of S805, and the second information is not received in the process of S806, then the controller 101 waits until the second information transmitted from the controller 80 of the printer 1 in the process of S1102 is received. The process is terminated when the second information is received.

<Technical Effect of Sixth Embodiment>

In the sixth embodiment, when it is unnecessary for the external apparatus 100 to acquire the second information in order to generate the recording data, the second information is acquired from the printer 1 after the completion of the transmission of the recording data from the external apparatus 100 to the printer 1. Accordingly, it is possible to realize such a situation that the transmission and reception of the second information between the printer 1 and the external apparatus 100 do not affect the transmission and reception of the recording data between the printer 1 and the external apparatus 100.

SEVENTH EMBODIMENT

Next, a seventh embodiment of the present disclosure will be explained. The seventh embodiment also relates to the printer 1 and the external apparatus 100 in the same manner as the first embodiment. Further, in the seventh embodiment, the controller 101 of the external apparatus 100 performs the process in accordance with the flow depicted in FIG. 13A, and the controller 80 of the printer 1 performs the process in accordance with the flow depicted in FIG. 13B. Accordingly, when the recording is performed on the recording paper P by means of the printer 1, the first information and the second information are transmitted and received between the controller 80 of the printer 1 and the controller 101 of the external apparatus 100.

Figure 13A:
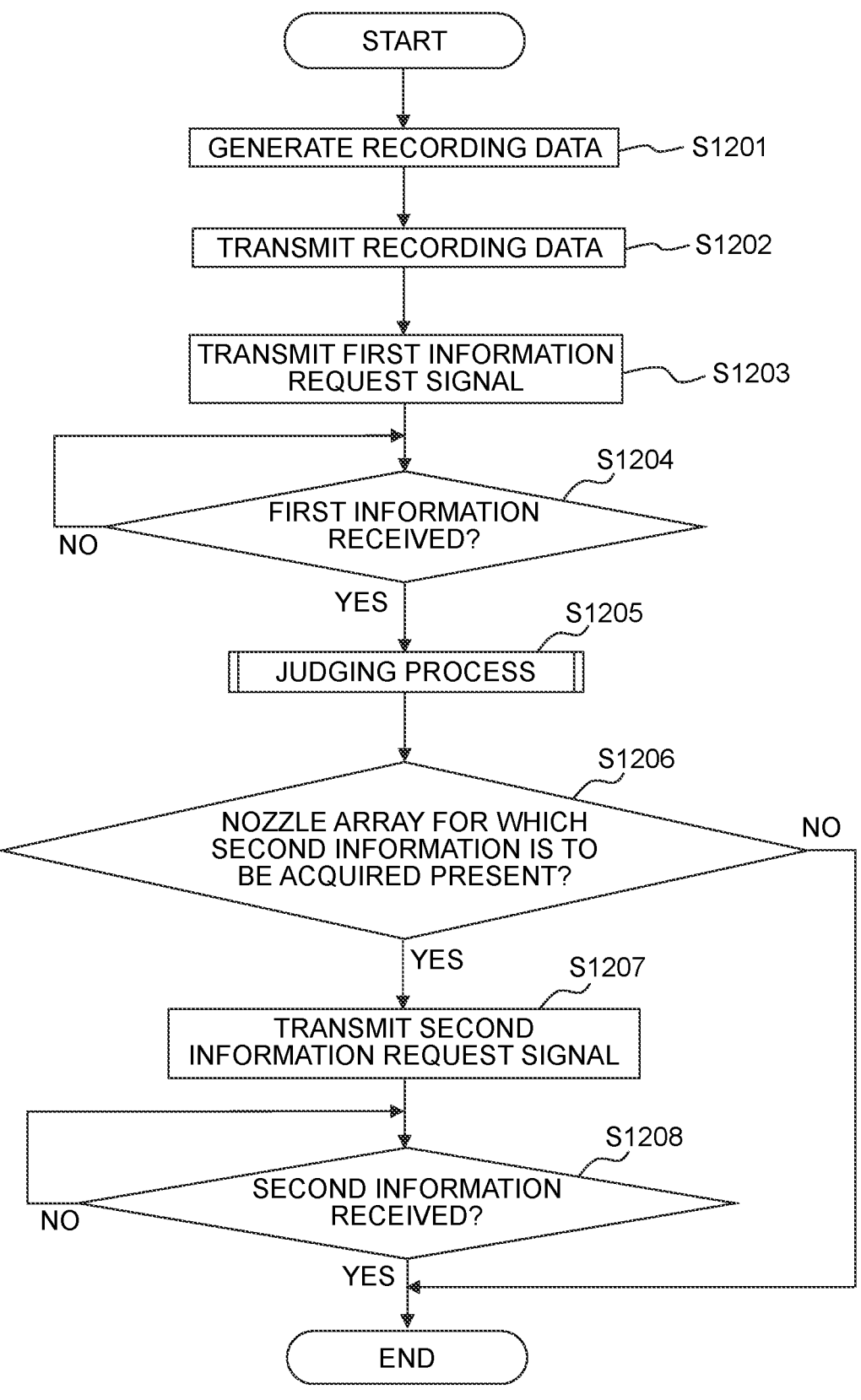
FIG. 13A is a flow chart illustrative of a flow of a process in the external apparatus when the recording is performed.

The flow depicted in FIG. 13A is started when the controller 101 of the external apparatus 100 receives the recording command. Then, when the recording command is received, then the controller 101 of the external apparatus 100 generates the recording data (S1201), and the generated recording data is transmitted to the controller 80 of the printer 1 (S1202). In the process of S1202, the controller 101 of the external apparatus 100 generates the recording data on the basis of the image data and the second information received, for example, during the recording in the past and stored in the memory 102.

Figure 13B:
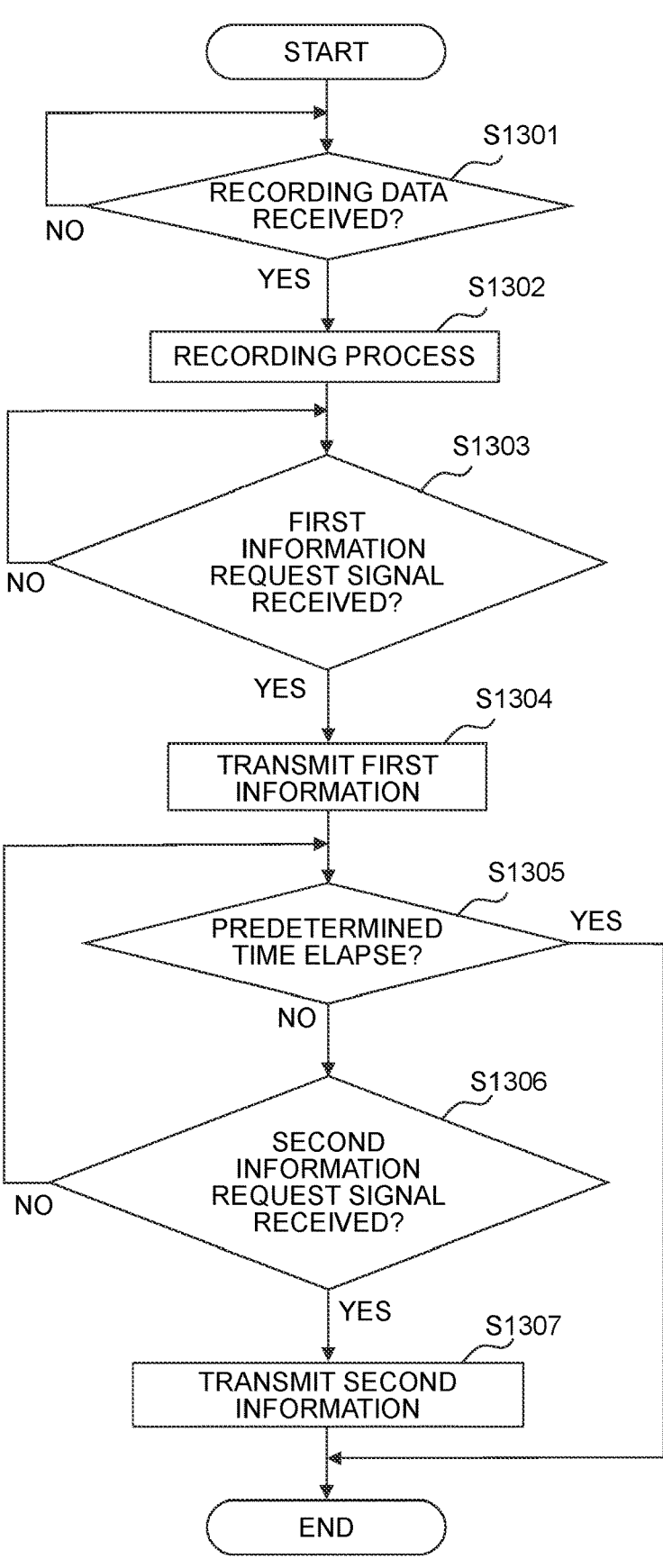
FIG. 13B is a flow chart illustrative of a flow of a process in the printer when the recording is performed.

As depicted in FIG. 13B, the controller 80 of the printer 1 waits until the recording data, which is transmitted from the external apparatus 100, is received (S1301: NO). If the recording data is received (S1301: YES), the recording process is executed (S1302) in the same manner as the process of S906 of the fifth embodiment.

As depicted in FIG. 13A, the controller 101 of the external apparatus 100 transmits the recording data in the process of S1203, and then the controller 101 transmits the first information request signal to the printer 1 (S1203). As depicted in FIG. 13B, the controller 80 of the printer 1 waits (S1303: NO) until the first information request signal, which is transmitted from the external apparatus 100, is received after the recording process of S1102. If the first information request signal is received (S1303: YES), the first information is transmitted to the external apparatus 100 (S1304).

As depicted in FIG. 13A, the controller 101 of the external apparatus 100 waits (S1204: NO) until the first information, which is transmitted from the printer 1, is received after the transmission of the first information request signal in the process of S1203. If the first information is received (S1204: YES), the processes of S1205 to S1208 are executed in the same manner as the processes of S204 to S207 of the first embodiment. Then, if the nozzle array 9, for which it is judged to acquire the second information, is absent (S1206: NO), and if the second information is received (S1208: YES), then the process is terminated.

As depicted in FIG. 13B, the controller 80 of the printer 1 executes the processes of S1305 to S1307 in the same manner as the processes of S303 to S305 of the first embodiment after the transmission of the first information in S1304. Then, if a predetermined time elapses (S1305: YES), and if the second information is transmitted in the process of S1307, then the process is terminated.

<Technical Effect of Seventh Embodiment>

In the seventh embodiment, the controller 101 of the external apparatus 100 does not perform the process for transmitting and receiving the first information and the second information with respect to the printer 1 before the generation and the transmission of the recording data. Then, the controller 101 of the external apparatus 100 acquires the first information from the printer 1 after the completion of the transmission of the recording data to the printer 1. If it is judged that the second information is necessary, the controller 101 acquires the second information. Accordingly, it is possible to realize such a situation that the transmission and reception of the first information and the second information between the printer 1 and the external apparatus 100 do not affect the transmission and reception of the recording data between the printer 1 and the external apparatus 100.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

The first to seventh embodiments of the present disclosure have been explained above. However, the present disclosure is not limited to the first to seventh embodiments, which can be variously changed within a scope defined in claims.

For example, in the second and third embodiments, the threshold value is set individually for each of the nozzle arrays 9 to judge whether or not the number of abnormal nozzles is not less than the threshold value or the number of recoverable nozzles is not less than the threshold value in relation to each of the nozzle arrays 9. However, there is no limitation thereto. For example, in the second and third embodiments, a common threshold value may be set for the four nozzle arrays 9 to judge whether or not the number of abnormal nozzles is not less than the threshold value or the number of recoverable nozzles is not less than the threshold value in relation to each of the nozzle arrays 9.

Further, in the first to seventh embodiments, the first information and the second information are the pieces of information provided individually for each of the nozzle arrays 9. Then, it is judged whether or not the second information is to be acquires on the basis of the first information individually for each of the nozzle arrays 9. The second information, which relates to the nozzle array 9 judged to acquire the second information therefor, is received. However, there is no limitation thereto.

For example, it is judged whether or not the second information is to be acquired on the basis of the first information individually for each of the nozzle arrays 9. If it is judged that the second information is to be acquired for the nozzle arrays 9 of not less than a predetermined number, the second information, which relates to all of the nozzles 10 of the ink-jet head 4, may be received.

Further, it is also allowable that the first information is not the individual information for each of the nozzle arrays 9. For example, in the first embodiment, the first information may be information to indicate whether or not any abnormal nozzle is present in the plurality of nozzles 10 of the ink-jet head 4. Further, for example, in the second embodiment, the first information may be information to indicate the number of abnormal nozzles of the plurality of nozzles 10 of the ink-jet head 4. Further, for example, in the third embodiment, the first information may be information to indicate the number of recoverable nozzles of the plurality of nozzles 10 of the ink-jet head 4. Further, in the fourth embodiment, the first information may be information to indicate whether or not the nozzle-information is updated for the plurality of nozzles 10 of the ink-jet head 4.

Further, in the first to seventh embodiments, the second information is the information to indicate whether or not each of the plurality of nozzles 10 is the abnormal nozzle. However, there is no limitation thereto. The second information may be any distinct information in which the data amount is large as compared with the first information.

Further, in the first to fourth embodiments, the process is performed in order to transmit and receive the first information and the second information every time when the predetermined time T1 elapses. However, there is no limitation thereto. The process may be performed in order to transmit and receive the first information and the second information, in every distinct predetermined cycle, for example, every time when the record is performed on a predetermined number of sheets of the recording paper P.

Alternatively, in the printer 1, the process may be performed in order to transmit and receive the first information and the second information when a condition, in which the nozzle-information may be changed highly possibly, is fulfilled, distinctly from every predetermined cycle.

Further, in the fifth to seventh embodiments, if the abnormal nozzle is present, the recording data is generated to complement the abnormal nozzle so that the dot, which corresponds to the abnormal nozzle, is formed by ejecting the ink from another nozzle that is not the abnormal nozzle, on the basis of the second information, for example, irrelevant to the number of abnormal nozzles. However, there is no limitation thereto. For example, on account of the condition of, for example, the number of abnormal nozzles and the distribution of abnormal nozzles as indicated by the second information, if it is difficult to generate the recording data as described above, and if the number of times of recording passes required for the recording of the image is excessively large when the recording data is generated as described above, then the recording data may be generated on condition that the suction purge is performed to provide a state in which the abnormal nozzle is absent.

Further, in the third embodiment, the unrecoverable nozzle is the abnormal nozzle which is not recovered by the suction purge. However, there is no limitation thereto. For example, when any one of a plurality of types of suction purge, in which the force to discharge the ink from the abnormal nozzle differs, can be selectively performed in the printer, the abnormal nozzle, which cannot be recovered even by the suction purge having the strongest force to discharge the ink, may be designated as the unrecoverable nozzle.

Further, the recovery action for recovering the abnormal nozzle is not limited to the suction purge. For example, a pressurizing pump, which pressurizes the ink contained in the ink-jet head 4, may be provided, for example, in the flow passage between the ink cartridge 14 and the ink-jet head 4. Then, the pressurizing purge, in which the ink contained in the ink-jet head 4 is discharged by driving the pressurizing pump in a state in which the plurality of nozzles 10 is covered with the cap 71, may be performed as the recovery action. Note that in this case, the cap 71 and the pressurizing pump constitute the "recovery unit" of the present disclosure.

Alternatively, both of the suction purge based on the driving of the suction pump 72 and the pressurizing purge based on the driving of the pressurizing pump described above may be performed as the recovery action. Note that in this case, the maintenance unit 8 and the pressurizing pump constitute the "recovery unit" of the present disclosure.

Further, the recovery action is not limited to the purge. For example, the ink-jet head 4 may be allowed to perform the flashing as the recovery action in which the ink is discharged from the abnormal nozzle. Note that in this case, the flashing corresponds to the "recovery action" of the present disclosure, and the ink-jet head 4 also serves as the "recovery unit" of the present disclosure.

Further, in the exemplary case described above, it is judged whether or not the nozzle 10 is the abnormal nozzle on the basis of the signal outputted from the signal processing circuit 78 in accordance with the change of the voltage of the electrode 76 arranged in the cap 71 as directed from the nozzle 10 when the ink-jet head 4 is allowed to perform the driving for inspection. However, there is no limitation thereto.

For example, an electrode, which extends in the vertical direction and which is opposed to the space disposed under or below the nozzle 10 in a state in which the carriage 2 is positioned at the maintenance position, may be provided in place of the electrode 76. Then, it is also allowable to output a signal from the signal processing circuit 78 in accordance with the change of the voltage of the foregoing electrode when the driving for inspection is performed in the state in which the carriage 2 is positioned at the maintenance position.

Alternatively, for example, it is also allowable to provide an optical sensor which directly detects the ink ejected from the nozzle 10 in a state in which the carriage 2 is positioned at a predetermined position such as the maintenance position or the like so that a signal is outputted in accordance with a detection result. Then, it is also allowable to judge whether or not the nozzle 10 is the abnormal nozzle on the basis of the signal outputted from the optical sensor.

Alternatively, for example, a voltage detection circuit, which detects the change of the voltage when the ink is ejected from the nozzle, may be connected to a plate on which the nozzle of the ink-jet head is formed, and it is also allowable to judge whether or not the nozzle is the abnormal nozzle on the basis of a signal outputted from the voltage detection circuit when the action is performed to eject the ink from the nozzle in a state in which the carriage is moved to an inspection position.

Alternatively, for example, the substrate of the ink-jet head may be provided with a temperature detecting element. Then, a heater is driven by applying a first applied voltage in order to eject the ink, and then the heater is driven by applying a second applied voltage so that the ink is not ejected. A signal, which depends on whether or not the nozzle 10 is the abnormal nozzle, may be outputted on the basis of the change of the temperature detected by the temperature detecting element during the period until a predetermined time thereafter elapses after applying the second applied voltage.

Alternatively, a predetermined test pattern may be recorded by the printer, and it is also allowable to judge whether or not any abnormal nozzle is present on the basis of a recording result of the test pattern. In this procedure, when the printer is a multifunction machine provided with a scanner, it is also allowable to input the recording result of the test pattern by allowing the scanner to read the test pattern. Alternatively, it is also allowable to input the recording result of the test pattern by operating the operation unit 68 and the external apparatus by the user on the basis of the recording result of the test pattern.

Further, in the exemplary case described above, it is judged whether or not the nozzle 10 is the abnormal nozzle by performing the driving for inspection in relation to all of the nozzles 10 of the ink-jet head 4. However, there is no limitation thereto. For example, it is also allowable to judge whether or not the nozzle 10 is the abnormal nozzle by performing the driving for inspection in relation to only some of the nozzles 10 of the ink-jet head 4, for example, in relation to the alternate nozzles 10 included in each of the nozzle arrays 9. Then, as for the other nozzles 10, it is also allowable to estimate whether or not the nozzle 10 is the abnormal nozzle on the basis of the judgment result in relation to the some of the nozzles 10 described above.

Further, in the exemplary case described above, it is judged whether or not the nozzle 10 is the abnormal nozzle on the basis of whether or not the ink is ejected from the nozzle 10. However, there is no limitation thereto. For example, it is also allowable to judge whether or not the nozzle 10 is the abnormal nozzle on the basis of, for example, the ejecting direction and/or the ejecting speed of the ink.

Further, in the foregoing description, such an example has been explained that the present disclosure is applied to the printer provided with the so-called serial head in which the inks are ejected from the plurality of nozzles while moving in the scanning direction together with the carriage. However, there is no limitation thereto. For example, it is also possible to apply the present disclosure to a printer provided with a so-called line head which extends over the entire length of the recording paper in the scanning direction.

Further, in the foregoing description, such an example has been explained that the present disclosure is applied to the printer which performs the recording on the recording paper P by ejecting the inks from the nozzles. However, there is no limitation thereto. The present disclosure is also applicable to a printer which records an image on any recording objective medium other than the recording paper, including, for example, T-shirts, sheets for outdoor advertisement, cases for mobile terminals such as smartphones or the like, corrugated cardboards, and resin members. Further, the present disclosure is also applicable to a liquid ejecting apparatus for ejecting any liquid other than the ink, including, for example, resin or metal in a liquid state.

What is claimed is:

1. A non-transitory computer readable medium recorded with a program for controlling an external apparatus configured to communicate with a liquid ejecting apparatus including a head having a plurality of nozzles and a memory configured to store nozzle-information relevant to a state of abnormality of a nozzle in the plurality of nozzles, wherein the program allows the external apparatus to execute:

acquiring first information corresponding to the nozzle-information from the liquid ejecting apparatus;

judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus;

wherein the first information is information relevant to whether or not an abnormal nozzle, which has abnormality to eject the liquid, is present in the plurality of nozzles of the head, and in a case that it is judged whether or not the second information is to be acquired, and in a case that the first information indicates that the abnormal nozzle is present, then it is judged that the second information is to be acquired from the liquid ejecting apparatus.

2. The non-transitory computer readable medium according to claim 1, wherein the plurality of nozzles includes a plurality of first nozzles, and a plurality of second nozzles configured to eject the liquid of a type different from that ejected by the plurality of first nozzles, and the first information resides in individual pieces of information in relation to the plurality of first nozzles and the plurality of second nozzles.

3. The non-transitory computer readable medium according to claim 1, wherein the second information is information to indicate whether or not each of the plurality of nozzles of the head is the abnormal nozzle.

4. The non-transitory computer readable medium according to claim 1, wherein in response that an instruction signal to instruct the liquid ejecting apparatus to execute ejection of the liquid onto a medium is received, the program allows the computer to execute:

generating ejection data in order to allow the liquid ejecting apparatus to eject the liquid onto the medium; and transmitting the generated ejection data to the liquid ejecting apparatus, the program allows the computer to execute acquiring the first information and judging whether or not the second information is to be acquired before transmitting the generated ejection data after receiving the instruction signal, in a case that it is judged that the second information is to be acquired from the liquid ejecting apparatus, the program allows the computer to execute acquiring the second information before the ejection data is generated, and the ejection data is generated based on the second information, and in a case that it is judged that the second information is not to be acquired from the liquid ejecting apparatus, the program does not allow the computer to execute acquiring the second information before generating the ejection data and transmitting the ejection data.

5. The non-transitory computer readable medium according to claim 4, wherein in a case that it is judged that the second information is not to be acquired from the liquid ejecting apparatus, the program allows the computer to execute acquiring the second information after completion of transmitting ejection data.

6. The non-transitory computer readable medium according to claim 4, wherein in a case that it is judged that the second information is to be acquired from the liquid ejecting apparatus, the program allows the computer to execute generating the ejection data after allowing the computer to execute acquiring the second information, and the ejection data is generated based on the second information such that a dot, which corresponds to an abnormal nozzle having abnormality to eject the liquid, is complemented so that the dot is formed by ejecting the liquid from the nozzle which is not the abnormal nozzle.

7. The non-transitory computer readable medium according to claim 1, wherein in response that an instruction signal to instruct the liquid ejecting apparatus to execute ejection of the liquid onto a medium is received, the program allows the computer to execute:

generating ejection data in order to allow the liquid ejecting apparatus to eject the liquid onto the medium; and transmitting data including the ejection data to the liquid ejecting apparatus, and the program allows the computer to execute acquiring the first information after completion of transmitting the ejection data.

8. The non-transitory computer readable medium according to claim 1, wherein the program allows the external apparatus to execute acquiring the first information in a predetermined cycle.

9. A non-transitory computer readable medium recorded with a program for controlling an external apparatus configured to communicate with a liquid ejecting apparatus including a head having a plurality of nozzles and a memory configured to store nozzle-information relevant to a state of abnormality of a nozzle in the plurality of nozzles, wherein the program allows the external apparatus to execute:

acquiring first information corresponding to the nozzle-information from the liquid ejecting apparatus;

judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus, wherein the first information is information relevant to the number of abnormal nozzles each having abnormality to eject the liquid, of the plurality of nozzles of the head, and in a case that it is judged whether or not the second information is to be acquired, and in a case that the first information indicates that the number of the abnormal nozzles is not less than a threshold value, then it is judged that the second information is to be acquired from the liquid ejecting apparatus.

10. The non-transitory computer readable medium according to claim 9, wherein the plurality of nozzles includes a plurality of first nozzles, and a plurality of second nozzles configured to eject the liquid of a type different from that ejected by the plurality of first nozzles, the first information resides in individual pieces of information in relation to the plurality of first nozzles and the plurality of second nozzles, and in a case that it is judged whether or not the second information is to be acquired, the threshold values are individually set for the first nozzles and the second nozzles to judge whether or not the second information is to be acquired from the liquid ejecting apparatus.

11. A non-transitory computer readable medium recorded with a program for controlling an external apparatus configured to communicate with a liquid ejecting apparatus including a head having a plurality of nozzles and a memory configured to store nozzle-information relevant to a state of abnormality of a nozzle in the plurality of nozzles, wherein the program allows the external apparatus to execute:

acquiring first information corresponding to the nozzle-information from the liquid ejecting apparatus;

judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus, wherein the liquid ejecting apparatus includes a recovery unit configured to perform a recovery action in order to recover any abnormal nozzle having abnormality to eject the liquid by discharging the liquid from the nozzle, the first information is information relevant to the number of abnormal nozzles of the plurality of nozzles of the head and the number of unrecoverable nozzles incapable of being recovered as the abnormal nozzles which cannot be recovered by the recovery action, and in a case that it is judged whether or not the second information is to be acquired, and in a case that the first information indicates that a number, which is obtained by subtracting the number of the unrecoverable nozzles incapable of being recovered from the number of the abnormal nozzles, is not less than a threshold value, then it is judged that the second information is to be acquired from the liquid ejecting apparatus.

12. The non-transitory computer readable medium according to claim 11, wherein the plurality of nozzles includes a plurality of first nozzles, and a plurality of second nozzles configured to eject the liquid of a type different from that ejected by the plurality of first nozzles, the first information resides in individual pieces of information in relation to the plurality of first nozzles and the plurality of second nozzles, and in a case that it is judged whether or not the second information is to be acquired, the threshold values are individually set for the first nozzles and the second nozzles to judge whether or not the second information is to be acquired from the liquid ejecting apparatus.

13. A non-transitory computer readable medium recorded with a program for controlling an external apparatus configured to communicate with a liquid ejecting apparatus including a head having a nozzle and a memory configured to store nozzle-information to indicate a state of the nozzle, wherein the program allows the external apparatus to execute:

acquiring first information corresponding to the nozzle-information from the liquid ejecting apparatus;

judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus, wherein the first information is information relevant to whether or not the nozzle-information, which is stored in the memory of the liquid ejecting apparatus, is updated from the nozzle-information which was stored in a case that the liquid ejecting apparatus transmitted the second information last time, and in a case that it is judged whether or not the second information is to be acquired, and in a case that the first information indicates that the nozzle-information is updated, then it is judged that the second information is to be acquired from the liquid ejecting apparatus.

14. A non-transitory computer readable medium recorded with a program for controlling an external apparatus configured to communicate with a liquid ejecting apparatus including a head having a plurality of nozzles and a memory configured to store nozzle-information relevant to a state of abnormality of a nozzle in the plurality of nozzles, wherein the program allows the external apparatus to execute:

acquiring first information corresponding to the nozzle-information from the liquid ejecting apparatus;

judging whether or not second information is to be acquired from the liquid ejecting apparatus based on the first information, the second information being information corresponding to the nozzle-information and the second information having a data amount larger than that of the first information; and in a case that it is judged that the second information is to be acquired from the liquid ejecting apparatus, acquiring the second information from the liquid ejecting apparatus, wherein the plurality of nozzles includes a plurality of first nozzles, and a plurality of second nozzles configured to eject the liquid of a type different from that ejected by the plurality of first nozzles, the first information resides in individual pieces of information in relation to the plurality of first nozzles and the plurality of second nozzles, in a case that it is judged whether or not the second information is to be acquired, it is individually judged whether or not the second information relevant to the plurality of first nozzles is to be acquired from the liquid ejecting apparatus and whether or not the second information relevant to the plurality of second nozzles is to be acquired from the liquid ejecting apparatus, and in a case that the second information is acquired, only the second information, which is judged to be acquired in the judging process and which is included in the second information relevant to the plurality of first nozzles and the second information relevant to the plurality of second nozzles, is acquired from the liquid ejecting apparatus.

\* \* \* \* \*